(12) United States Patent
Jordan et al.

(10) Patent No.: US 12,477,133 B2
(45) Date of Patent: Nov. 18, 2025

(54) SYNCHRONISING FRAME DECODING IN A MULTI-LAYER VIDEO STREAM

(71) Applicant: V-NOVA INTERNATIONAL LIMITED, London (GB)

(72) Inventors: Andrew Jordan, London (GB); Elias Serrano, London (GB); Dean Alexandrou, London (GB); Vinod Balakrishnan, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/722,270

(22) PCT Filed: Dec. 20, 2022

(86) PCT No.: PCT/GB2022/053324
§ 371 (c)(1),
(2) Date: Jun. 20, 2024

(87) PCT Pub. No.: WO2023/118851
PCT Pub. Date: Jun. 29, 2023

(65) Prior Publication Data
US 2025/0159219 A1    May 15, 2025

(30) Foreign Application Priority Data

Dec. 20, 2021    (GB) .................................... 2118504

(51) Int. Cl.
*H04N 7/12*         (2006.01)
*H04N 19/31*        (2014.01)
*H04N 19/33*        (2014.01)
*H04N 19/44*        (2014.01)
*H04N 19/467*       (2014.01)

(52) U.S. Cl.
CPC ............. *H04N 19/31* (2014.11); *H04N 19/33* (2014.11); *H04N 19/44* (2014.11); *H04N 19/467* (2014.11)

(58) Field of Classification Search
CPC ...................................................... H04N 19/33
See application file for complete search history.

(56) References Cited

FOREIGN PATENT DOCUMENTS

GB        2597551 A      2/2022

OTHER PUBLICATIONS

International Search Report for application No. PCT/GB2022-053324 dated May 4, 2023.
(Continued)

*Primary Examiner* — Y Lee
(74) *Attorney, Agent, or Firm* — Workman Nydegger

(57) ABSTRACT

A method and system for decoding a multi-layer video stream are described. The multi-layer video stream has at least a first and second layer. The method includes obtaining second-layer decoded data for the multi-layer video stream using a second decoding method, where the second-layer decoded data is indexed using a timestamp, receiving a call-back indicating an availability of first-layer decoded data for a frame of the first layer of the multi-layer video stream from a first decoding method, obtaining timing metadata for the first-layer decoded data, comparing the timing metadata with one or more timestamps for the second-layer decoded data to pair the first-layer decoded data for the frame with second-layer decoded data for the frame, and combining the first-layer decoded data for the frame and the paired second-layer decoded data to output a reconstruction of the frame of the video signal.

20 Claims, 9 Drawing Sheets

(56) References Cited

OTHER PUBLICATIONS

Written Opinion of the International Searching Authority for application No. PCT/GB2022-053324.
International Preliminary Report on Patentability received for PCT Patent Application No. PCT/GB2022/053324, mailed on Jul. 4, 2024, 12 pages.
International Search Report and Written Opinion received for PCT Patent Application No. PCT/GB2022/053324, mailed on Apr. 5, 2023, 14 pages.
Seema. A. et al, "WVSNP-DASH: Name-Based Segmented Video Streaming", IEEE Transactions on Broadcasting, IEEE Service Center, Piscataway, NJ, US, vol. 61, No. 3, Sep. 1, 2015, pp. 346-355.
Simone Ferrara V-Nova Services Ltd: CM-AVC66lr3—NGV Proposal—LCEVC, DVB, Digital Video Broadcasting, No. 3 Sep. 8, 2021, XP017862224.
V-Nova: "HTML5 Integration Guide—V-NOVA", Apr. 6, 2022, pp. 1-10, XP055909957.

SYNCHRONISING FRAME DECODING IN A MULTI-LAYER VIDEO STREAM

CROSS-REFERENCE TO RELATED APPLICATIONS

This application is a 371 US Nationalization of International Application No. PCT/GB2022/053324, filed Dec. 20, 2022, which claims priority from GB Patent Application No: 2118504.6, filed Dec. 20, 2021, the disclosures of which are hereby incorporated herein by reference in their entirety.

TECHNICAL FIELD

The present invention relates to the decoding of a multi-layer video stream. In particular, the present invention relates to pairing or synchronising decoded data across multiple layers of the multi-layer video stream.

BACKGROUND

Multi-layer video coding schemes have existed for a number of years but have experienced problems with widespread adoption. Much of the video content on the Internet is still encoded using H.264 (also known as MPEG-4 Part 10, Advanced Video Coding-MPEG-4 AVC), with this format being used for between 80-90% of online video content. This content is typically supplied to decoding devices as a single video stream that has a one-to-one relationship with available hardware and/or software video decoders, e.g. a single stream is received, parsed, and decoded by a single video decoder to output a reconstructed video signal. Many video decoder implementations are thus developed according to this framework. To support different encodings, decoders are generally configured with a simple switching mechanism that is driven based on metadata identifying a stream format.

Existing multi-layer coding schemes include the Scalable Video Coding (SVC) extension to H.264, Scalable extensions to H.265 (MPEG-H Part 2 High Efficiency Video Coding-SHVC), and newer standards such as MPEG-5 Part 2 Low Complexity Enhancement Video Coding (LCEVC). While H.265 is a development of the coding framework used by H.264, LCEVC takes a different approach to scalable video. SVC and SHVC operate by creating different encoding layers and feeding each of these with a different spatial resolution. Each layer encodes the input according to a normal AVC or HEVC encoder with the possibility of leveraging information generated by lower encoding layers. LCEVC, on the other hand, generates one or more layers of enhancement residuals as compared to a base encoding, where the base encoding may be of a lower spatial resolution.

One reason for the slow adoption of multi-layer coding schemes has been the difficulty adapting existing and new decoders to process multi-layer encoded streams. As discussed above, video streams are typically single streams of data that have a one-to-one pairing with a suitable decoder, whether implemented in hardware or software or a combination of the two. Client devices and media players, including Internet browsers, are thus built to receive a stream of data, determine what video encoding the stream uses, and then pass the stream to an appropriate video decoder. Within this framework, multi-layer schemes such as SVC and SHVC have typically been packaged as larger single video streams containing multiple layers, where these streams may be detected as "SVC" or "SHVC" and the multiple layers extracted from the single stream and passed to an SVC or SHVC decoder for reconstruction. This approach though often mitigates some of the benefits of multi-layer encodings. Hence, many developers and engineers have concluded that multi-layer coding schemes are too cumbersome and return instead to a multicast of single H.264 video streams.

It is thus desired to obtain an improved method and system for decoding multi-layer video data that overcomes some of the disadvantages discussed above and that allows more of the benefits of multi-layer coding schemes to be realised.

The paper "The Scalable Video Coding Extension of the H.264/AVC Standard" by Heiko Schwarz and Mathias Wien, as published in IEEE Signal Processing Magazine 135, March 2008, provides an overview of the SVC extension.

The paper "Overview of SHVC: Scalable Extensions of the High Efficiency Video Coding Standard" by Jill Boyce, Yan Ye, Jianle Chen, and Adarsh K. Ramasubramonian, as published in IEEE Transactions on Circuits and Systems for Video Technology, VOL. 26, NO. 1, January 2016, provides an overview of the SHVC extensions.

The decoding technology for LCEVC is set out in the Draft Text of ISO/IEC FDIS 23094-2 as published at Meeting 129 of MPEG in Brussels in January 2020, as well as the Final Approved Text and WO 2020/188273 A1. FIG. 29B of WO 2020/188273 A1 describes a hypothetical reference decoder where a demuxer provides a base bitstream to a base decoder and an enhancement bitstream to an enhancement decoder.

US 2010/0272190 A1 describes a scalable transmitting/receiving apparatus and a method for improving availability of a broadcasting service, which can allow a reception party to select an optimum video according to an attenuation degree of a broadcasting signal by scalably encoding video data and transmitting it by a different transmission scheme for each layer. US 2010/0272190 A1 encodes HD and SD video streams using an H.264 scalable video encoder (i.e., using SVC) and generates different layers of the SVC encoding using different packet streams. At a decoding device, a DVB-S2 receiver/demodulator receives/demodulates a satellite broadcasting signal from a transmitting satellite and restores a first layer packet stream and a second layer packet stream. At the decoding device, a scalable combiner combines the restored first- and second-layer packet streams in input order generating a single transport stream. A subsequent demultiplexer demultiplexes and depacketizes the combined transport stream and splits it into first- and second-layer video streams, which are then passed to an H.264 scalable video decoder for decoding and generation of a reconstruction of the original HD video stream.

WO 2017/141038 A1 describes a physical adapter that is configured to receive a data stream comprising data useable to derive a rendition of a signal at a first level of quality and reconstruction data produced by processing a rendition of the signal at a second, higher level of quality and indicating how to reconstruct the rendition at the second level of quality using the rendition at the first level of quality. WO 2017/141038 A1 describes how a presentation timestamp (PTS) may be used to synchronise different elementary streams, a first elementary stream with a first packet identifier (PID) and a second elementary stream with a second packet identifier (PID).

All of the above publications set out above are to be incorporated by reference herein.

SUMMARY OF THE INVENTION

Aspects of the present invention are set out in the appended independent claims. Variations of these aspects are set out in the appended dependent claims.

According to a first example, there may be provided a method of decoding a multi-layer video stream, the multi-layer video stream encoding a video signal and comprising at least a first layer and a second layer, the first layer being decoded using a first decoding method and the second layer being decoded using a second decoding method, the first decoding method using data that is inaccessible to the second decoding method, the method comprising: obtaining second-layer decoded data for the multi-layer video stream using the second decoding method, the second-layer decoded data relating to at least one frame of the video signal, the second-layer decoded data being indexed using a timestamp derived from the multi-layer video stream; receiving a call-back indicating an availability of first-layer decoded data for a frame of the first layer of the multi-layer video stream from the first decoding method; obtaining timing metadata for the first-layer decoded data, the timing metadata being associated with a rendering of the frame for the first layer; comparing the timing metadata with one or more timestamps for the second-layer decoded data to pair the first-layer decoded data for the frame with second-layer decoded data for the frame; and combining the first-layer decoded data for the frame and the paired second-layer decoded data to output a reconstruction of the frame of the video signal.

According to a second example there may be provided a system for decoding a multi-layer video stream, the multi-layer video stream encoding a video signal and comprising at least a first layer and a second layer, comprising: a second-layer decoder to decode the second layer of the multi-layer video stream; a memory to store an output of the second-layer decoder, said output being indexed using a timestamp derived from the multi-layer video stream; and a decoding controller communicatively coupled to a first-layer decoder, the first-layer decoder using data that is inaccessible to the second-layer decoder, the decoding controller being configured to: receive a call-back indicating an availability of first-layer decoded data from the first-layer decoder for a frame of the first layer; obtain timing metadata for the first-layer decoded data, the timing metadata being associated with a rendering of the frame for the first layer; compare the timing metadata with one or more timestamps for the output of the second-layer decoder to pair the first-layer decoded data for the frame with second-layer decoded data for the frame; and combine the first-layer decoded data for the frame and the paired second-layer decoded data to output a multi-layer reconstruction of the frame of the video signal.

DETAILED DESCRIPTION

Figure 1:
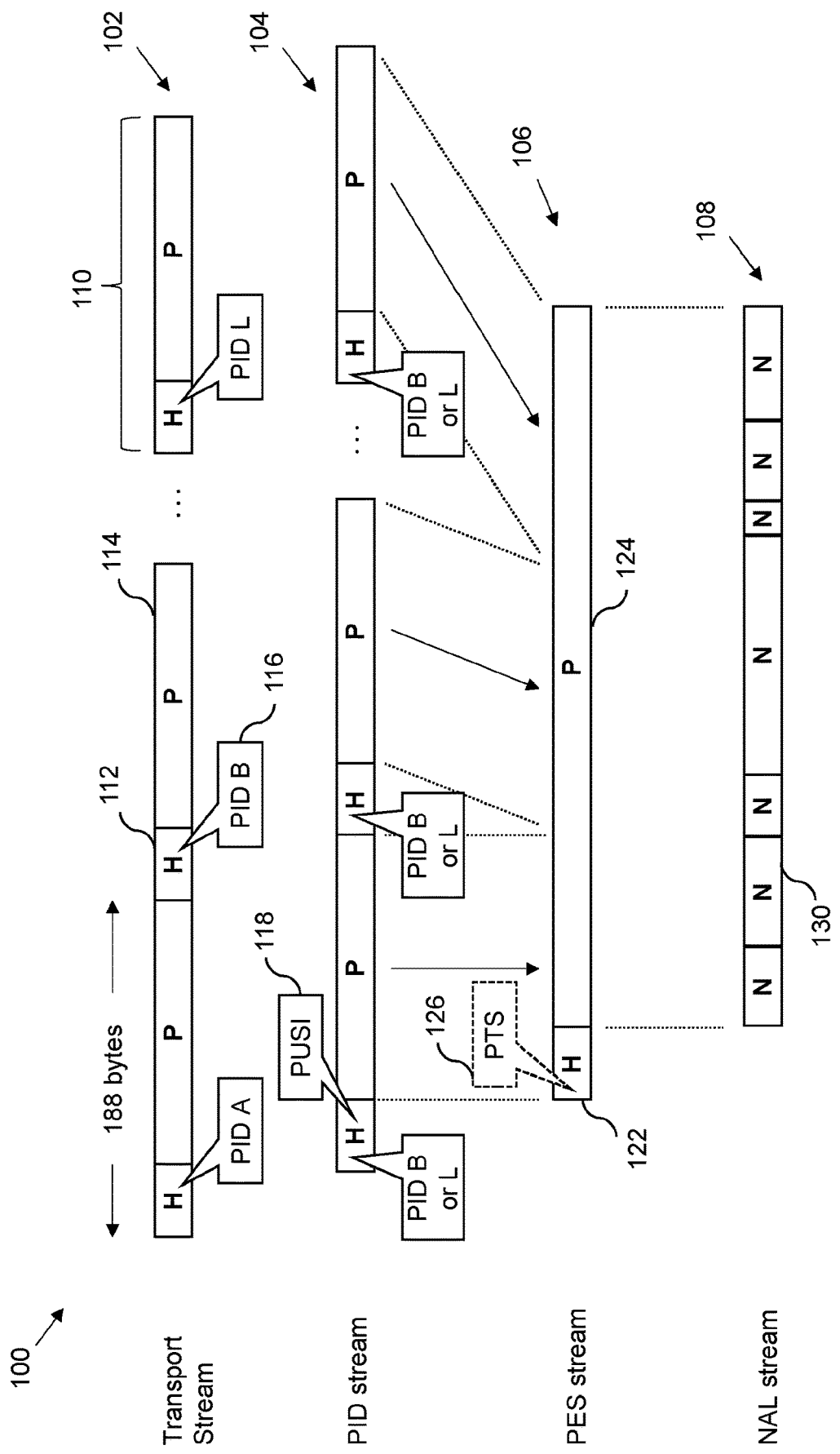
FIG. 1 is a schematic diagram showing how encoded video data may be transported within various data streams.

Certain examples described herein allow decoding devices to be easily adapted to handle multi-layer video coding schemes. Certain examples are described with reference to an LCEVC multi-layer video stream, but the general concepts may be applied to other multi-layer video schemes including SVC and SHVC, as well as multi-layer watermarking and content delivery schemes. Certain examples described herein are particularly useful in cases where a first layer of a multi-layer video stream is decoded by a first-layer decoder, which implements a first decoding method, and a second layer of the multi-layer video stream is decoded by a second-layer decoder, which implements a second decoding method. To allow flexibility in the multi-layer configuration, the first layer may be encoded using a variety of video coding methods, such as H.264 and H.265 as described above, as well as new and/or yet to be implemented video coding methods such Versatile Video Coding (VVC or H.266). Hence, the first-layer decoder may vary for different encoded video streams. In example described herein, support is provided for fully encapsulated first-layer decoders that provide restricted access to internal data. For example, a first-layer decoder may comprise a hardware component such as a secure hardware decoder chipset where other processes within a client device performing the decoding cannot access data supplied in packets for the first layer. Instead, these processes may only have access to a decoded output of the first-layer decoder. Examples described herein thus allow data for a second layer of the multi-layer video stream to be decoded separately using a different decoding method but then combined with the appropriate output of the first-layer decoder, e.g. to provide an enhanced video output.

In particular, examples described herein enable an output of a second-layer decoder to be combined with an output of a first-layer decoder, where the first-layer decoder uses data that is inaccessible to the second-layer decoder. For example, a presentation time stamp (PTS) that is supplied in packets for a first layer stream that is received and decoded by the first-layer decoder may not be accessible to the second-layer decoder, the second-layer decoder receiving a second layer stream for decoding. Hence, the second-layer decoder may not be able to use the PTS to synchronise its decoded output with the output of the first-layer decoder.

In certain examples described herein, a call-back indicating an availability of first-layer decoded data from the first-layer decoder for a frame of the first layer is used to obtain timing metadata for the first-layer decoded data. For example, this may comprise a display or rendering time for the first-layer decoded data. The second-layer decoder then uses a time stamp, such as a PTS, that it has access to via the second layer stream, to find a match within the first-layer decoded data. This may be performed by comparing the timing metadata with the time stamp. The matched first-layer decoded data may then be combined with the second-layer decoded data to output a reconstruction of the frame of the video signal. For example, a decoded frame of video data from the first-layer decoder may be combined with one or more decoded frames from the second-layer decoder. The present examples may be beneficial in cases where the second-layer comprises residual data, watermarking data, and/or localised embedded metadata.

In certain variations, the second-layer decoded data may have two or more sublayers at two or more resolutions, e.g. spatial resolutions. In these cases, the matched first-layer decoded data, with or without correction at the decoded resolution, may be upsampled to a higher resolution to provide enhancement via the second layer. In some implementations, the first-layer decoded data may also be generally available to output processes as well as the combined reconstruction, thus providing different options for viewing.

In certain examples described herein, different layers of a multi-layer video coding may be transmitted as separate packets that are multiplexed within a transport stream. This allows different layers to be effectively supplied separately and for enhancement layers to be easily added to pre-existing or pre-configured base layers. At a decoding device, different packet sub-streams may be received and parsed, e.g. based on packet identifiers (PIDs) within packet headers.

In the description below, a first example of an encoded video stream is described with reference to FIG. 1. Example systems and methods of decoding a multi-layer video stream are then described with reference to FIGS. 2A, 2B, 3 and 4. One example of a specific multi-layer coding scheme is then described with reference to FIGS. 5 to 7.

FIG. 1 shows an example 100 of a Transport Stream (TS) 102 that may be used to transmit encoded video data to one or more decoding devices. The Transport Stream 102 comprises a sequence of fixed-length 188-byte TS packets 110. Each TS packet 110 has a header 112, which may have a variable length, and a payload 114. The header 112 includes one or more data fields. One of these data fields provides a Packet Identifier (PID) 116. The PID is used to distinguish different sub-streams within the Transport Stream. The PID may be a number of bits of a fixed length (e.g., 13 bits) that stores a numeric or alphanumeric identifier (typically represented as hexadecimal value). For example, the PID 116 may be used to identify different video streams that are multiplexed together into a single stream that forms the Transport Stream 102. An example Transport Stream specification is set out in MPEG-2 Part 1 and defined as part of ISO/IEC standard 13818-1 or ITU-T Rec. H.222.0.

FIG. 1 also shows one of the so-called PID streams 104 that may be extracted from the Transport Stream 102. The PID stream 104 comprises a stream of consecutive packets 110 that have a common (i.e., shared) PID value. The PID stream 104 may be created by demultiplexing the Transport Stream 102 based on the PID value. The PID stream 104 thus represents a sub-stream of the Transport Stream 102.

In certain cases, there may be special PID values that are reserved for indexing tables. In one case, one PID value may be reserved for a program association table (PAT) that contains a directory listing of a set of program map tables, a program map table (PMT) comprising a mapping between one or more PID values and a particular "program". Originally a "program" related to a particular broadcast program but with Internet streaming, the term is used broadly to relate to the content of a particular video stream.

FIG. 1 also shows a Packetised Elementary Stream (PES) 106 that is constructed based on the payload data of a plurality of TS packets 110. A PES comprises data from payloads of a PID stream that carries media sample data. Media sample data may comprise video data as well as other modalities, such as audio data, subtitle data, or volumetric data. In FIG. 1, a PES is generated by combining the payloads 114 of multiple media TS packets 110 that are associated with a common (i.e., shared) PID value. The PES comprises a packet stream where each PES packet consists of a header (i.e., a PES Header) 122 and a payload 124, the payload 124 carrying the combined data. The start of a new PES packet is indicated by a one-bit field from the TS header 112, called a Payload Unit Start Indicator (PUSI) 118. When the PUSI is set, the first byte of the TS packet payload 114 indicates where a new PES payload unit starts. This allows a decoding device that starts receiving data mid-transmission to determine when to start extracting data. The PES header 122 contains a Presentation Time Stamp (PTS) 128. This indicates a time of presentation for the corresponding piece of media encapsulated within the payload 124.

FIG. 1 lastly shows the contents of the PES payload 124 for a video stream. In this case, the PES payload 124 comprises a sequence 108 of NAL units 130 (i.e., a NALU stream). These may form part of an Access Unit for the video stream, i.e. a set of NAL units that are associated with a particular output time, are consecutive in decoding order, and contain a coded picture or frame. FIG. 1 shows a NALU stream 108 that may be provided to a suitable video decoder for decoding.

The example of FIG. 1 shows how different layers of a multi-layer video stream, e.g. an encoded video stream, may be communicated to decoding devices. The Transport Stream 102, for example, may be transmitted over one or more communication channels, including over-the-air transmissions as well as network communications. In the example of FIG. 1, different layers of a multi-layer video stream may be delivered as different PID sub-streams, e.g. packets with a PID of "B" may represent encoded data for a first layer ("base") stream, whereas packets with a PID of "L" may represent encoded data for a second layer ("LCEVC" or enhancement) stream. The different sub-streams for each layer may be demultiplexed and provided as a PES 106 to a video decoder. Although FIG. 1 shows an example Transport Stream, other digital media containers, such as "tracks" on computer-readable media such as discs or solid-state storage, may also be used to provide encoded layer data. In certain cases, encoded data for different layers may be read using a client device file system (e.g., as different tracks from a provided medium).

Figure 2A:
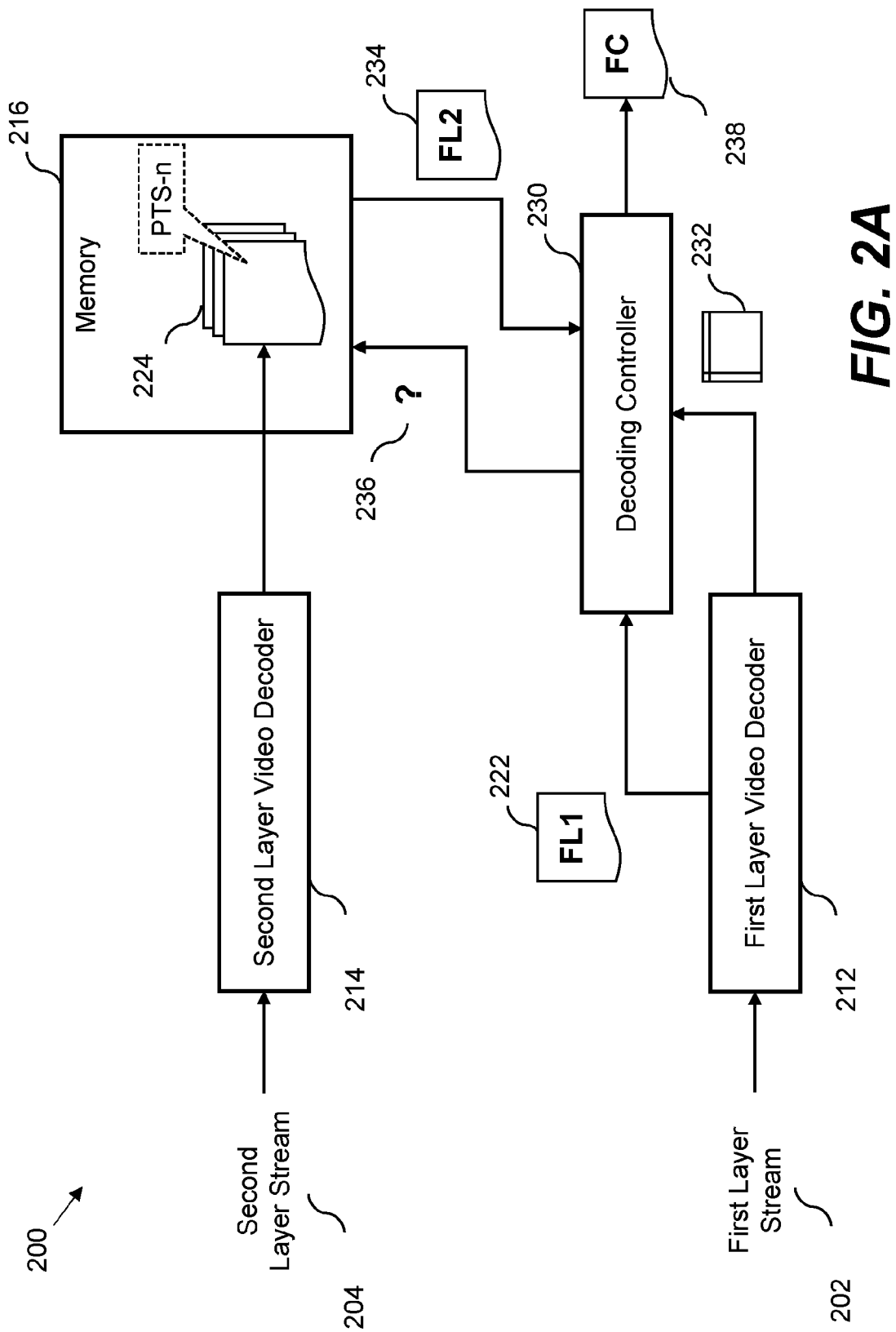
FIGS. 2A and 2B are schematic diagrams showing example systems for receiving and decoding multiple streams of encoded data.

FIG. 2A shows an example system 200 for decoding a multi-layer video stream. The system 200 may be implemented as part of a client computing device, such as a smartphone, laptop, smart television, or other media receiver and/or player. The multi-layer video stream encodes a video signal and comprises at least a first layer and a second layer. The first layer may comprise an encoding according to a first coding method, scheme, or standard, such as one of H.264, H.265 or H.266, amongst others. The first layer may be referred to as a "base" layer. The first layer may be encoded according to a first level of quality, such as a first spatial resolution, a first level of quantisation, a first specified or desired bit rate, and/or a first temporal resolution. The first layer may be a complete video encoding, i.e. encoded data may be received, decoded, and rendered regardless of the presence of further layers. The second layer may comprise an encoding according to a second coding method, scheme, or standard. For example, the second layer may comprise an "enhancement" layer for enhancing or otherwise augmenting the "base" layer. The second layer may be encoded using an enhancement coding method such as LCEVC. The second layer may comprise an encoding of a residual data stream, e.g. for combination with the first layer. The second layer may be encoded according to a second level of quality, such as a second spatial resolution, a second level of quantisation, a second specified or desired bit rate, and/or a second temporal resolution. The second level of quality may be higher than the first level of quality, e.g. to provide an enhancement. Each layer may be received as a series of NAL units, such as 108 in FIG. 1, where the NAL units comprise encoded data for the layer for a particular frame. Each layer may comprise a sequence of encoded data for consecutive frames. In certain cases, the sequence of encoded data may relate to a group of pictures.

In FIG. 2A, the system 200 receives a first layer stream 202 and a second layer stream 204. The term "stream" is used herein to refer to consecutive portions of data that are received or accessed. The first- and second-layer streams 202, 204 may result from a demultiplexing operation, such as an operation performed on Transport Stream 102 to extract one of PID stream 104 or PES 106, or may comprise data read from one or more files. In the system 200 of FIG. 2A, the first layer stream 202 is provided to a first layer video decoder 212 and the second layer stream 204 is provided to a second-layer decoder 214. The first layer video decoder 212 is configured to decode the first layer of the multi-layer video stream and the second layer video decoder 214 is configured to decode the second layer of the multi-layer video stream. The first layer video decoder 212 may be implemented using a video codec. The video codec may be hardware and/or software based. In certain cases, the first layer video decoder 212 may use hardware acceleration, wherein one or more actions performed as part of the decoding are implemented using a specifically configured hardware device (such as a particular video decoding chip-set). In certain cases, the first layer video decoder 212 may be implemented using one or more operating system services, e.g, functions provided as part of an operating system such as iOS®, Windows®, or Linux®. The second layer video decoder 214 may be an LCEVC decoder, e.g. a software decoder implemented according to the LCEVC standard.

In FIG. 2A, the second layer video decoder 214 is communicatively coupled to a memory 216. The memory 216 is configured to store an output of the second-layer decoder 214. The memory 216 may comprise a dedicated hardware buffer and/or a portion of shared system memory reserved for video decoding. The second layer video decoder 214 is configured to decode frames of data 224 for the second layer and store these in the memory 216. If the second layer video decoder 214 is configured to receive and decode one or more sub-layers of residual data (as in LCEVC), the frames of data 224 may comprise one or more frames at one or more respective resolutions.

FIG. 2A also shows a decoding controller 230. The decoding controller 230 may form part of a decoder integration layer that is configured to control the decoding of a multi-layer video, e.g. in association with the first layer video decoder 212 and the second layer video decoder 214. In one case, the first layer video decoder 212 may be implemented as an independent video decoder (e.g., an independent codec) for the first layer (e.g., that is able to decode first layer data in the absence of second layer data) and the decoding controller 230 and the second layer video decoder 214 may be implemented as part of a multi-layer decoder that is configured to enhance the first layer with one or more additional layers of video encoding. The decoding controller 230 may be implemented in software (e.g., as executed by a processor of a client device) and/or using dedicated hardware. In one case, the decoding controller 230 and the second layer video decoder 214 may be implemented as a software (including firmware) enhancement to an existing or legacy video decoding system (including those with hardware acceleration for the first layer). One example decoding system that may be adapted to provide the functionality of the second layer video decoder 214 and the decoding controller 230 is described in PCT/GB2021/051940, which is incorporated by reference herein.

In FIG. 2A, the decoding controller 230 is communicatively coupled to the first-layer decoder 212. The decoding controller 230 is configured to receive a call back 222 indicating an availability of first-layer decoded data from the first-layer decoder 212 for a frame of the first layer. For example, the decoding controller 230 may request a call back from the first-layer decoder 212 whenever decoded data for the first layer is ready for rendering. The term "call back" is used herein to refer to a communication or signal that is sent between hardware and/or software components to indicate an event has occurred. In hardware, a call back may comprise a physical signal sent over a communication bus or channel and/or a change in a register value (e.g., representing a binary flag). In software, a call back may comprise an asynchronous function return and/or a change in a monitored value in memory. The call back 222 may comprise a call back that is used, in comparative cases, for rendering an output of the first-layer decoder 212. For example, the call back 222 may indicate that a frame of video encoded using the first layer has been decoded from the first layer stream 202 and is ready for display as part of a rendered video. In certain cases, the call back 222 may comprise the data for the decoded frame (e.g., Frame Layer 1—FL1); in other cases, the call back 222 may comprise a reference that indicates where the decoding controller 230 may access the decoded data, such as a memory address.

On receipt of the call back 222, the decoding controller 230 is configured to further obtain timing metadata 232 for the first-layer decoded data, e.g. the decoded first layer frame. The timing metadata 232 is associated with a rendering of the frame for the first layer. The timing metadata 232 may be generated by the first-layer decoder 212. For example, the timing metadata 232 may be generated to help a downstream process render or otherwise display the first-layer decoded data. In one case, the timing metadata 232 may comprise one of a media time for the frame derived from the first-layer decoded data or a current playback time for the frame derived from the first-layer decoded data. The timing metadata 232 may be provided as part of the call back 222, and/or may be accessible with the first-layer decoded data, e.g. from a memory address associated with a memory address for the first-layer decoded data.

Following receipt of the call back 222, and having obtained the timing metadata 232, the decoding controller 230 is configured to compare the timing metadata with one or more timestamps for the output of the second-layer decoder to pair the first-layer decoded data for the frame with second-layer decoded data for the frame. In the example of FIG. 2A, the decoding controller 230 performs a query 236 on the second-layer decoded data 224 that is stored in the memory 216. In particular, the decoding controller 230 looks for a match between a timestamp stored with each portion of the second-layer decoded data, such as each decoded frame of second layer data, and the timing metadata 232, e.g. a media or playback time, associated with the ready from of first-layer decoder data. For example, the decoding controller 230 may be configured to search for second-layer decoded data that has a timestamp that falls within a range defined with reference to a time indicated by the timing metadata. This range may be set based on a configurable drift offset. In this case, the decoding controller 230 may search for data within the memory where the timestamp of the data plus a small drift offset equals a time indicated within the timing metadata. The configurable drift offset may be a small number of milliseconds (e.g., 10 ms) and may be set based on a framerate of the rendering (e.g., may be reduced for higher framerates).

In FIG. 2A, the decoding controller 230 retrieves second-layer decoded data 234 based on the comparison and combines this with the first-layer decoded data 222 to output a reconstruction 238 of the frame of the video signal. The reconstruction 238 may be an enhanced frame whereby second-layer decoded data 234 in the form of residual data for the frame is combined with a decoded frame for the first layer. The decoding controller 230 may apply one or more sub-layers of enhancement based on the second-layer decoded data 234, e.g. the second-layer decoded data 234 may comprise two sub-layers of residual data as described later with reference to FIGS. 5 to 7. In certain configurations, if no second-layer decoded data 234 is located, e.g. because there has been an issue with receipt of data for the second layer stream or network congestion, then the decoding controller 230 may simply output the first-layer decoded data 222 (e.g., without enhancement), e.g. act in a pass-through mode. The output of the decoding controller 230 may be rendered on a display forming part of, or communicatively coupled to, a client device implementing system 200. In other cases, the output of the decoding controller 230 may be made available to other processes, e.g. in memory 216 or another buffer.

Figure 2B:
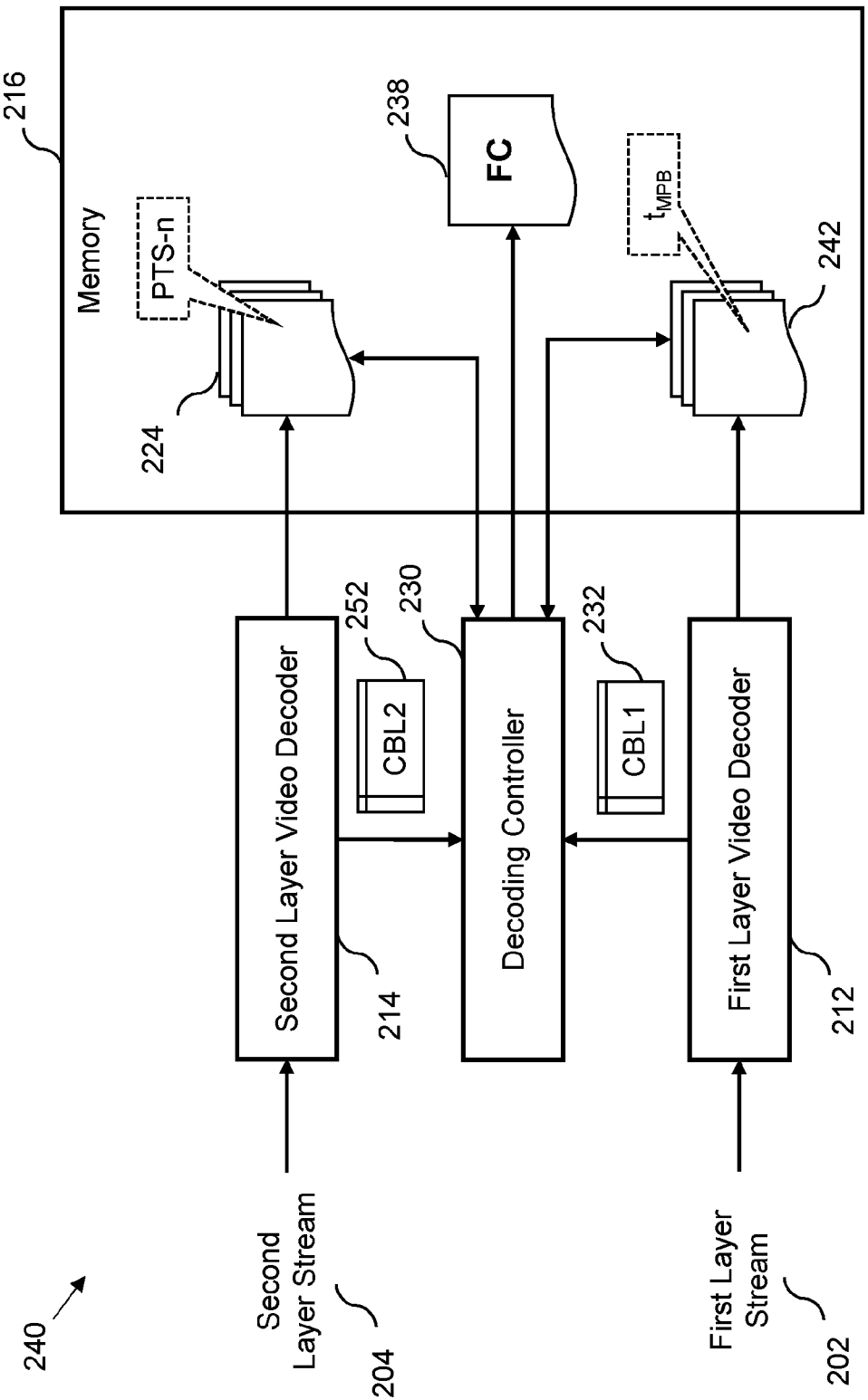

FIG. 2B shows an alternative configuration 240 of the system 200. In the configuration of FIG. 2A, each of the first-layer video decoder 212, the second-layer video decoder 214, and the decoding controller 230 access data stored within the memory 216. In this case, the decoding controller 230 is configured to receive call backs from both the first-layer video decoder 212 and the second-layer video decoder 214. The first-layer video decoder 212 sends a first call back 232 to the decoding controller 230 to indicate a new frame of first layer data 242 is ready. The second-layer video decoder 214 sends a call back 252 to the decoding controller 230 to indicate a new frame of second layer data 224 is ready. Both the first-layer video decoder 212 and the second-layer video decoder 214 may be configured to buffer decoded frames within the memory 216. Although the memory 216 is shown as a shared memory in FIG. 2B, in other implementations it may comprise separate memories that are accessible by the appropriate components (e.g., dedicate hardware or software frame buffers for each decoder).

As for FIG. 2A, the frames of first layer data 242 are indexed using timing metadata values, which in FIG. 2B are shown as a media playback time $t_{MPB}$, and the frames of the second layer data 224 are indexed using the timestamps from the second layer stream 204, e.g. the PTS values. In FIG. 2B, the decoding controller 230 is configured to coordinate receipt of the call backs 232 and 252 and compare timing metadata and timestamp values to locate corresponding frames of the first layer data 242 and the second layer data 224. In certain cases, the decoding controller 230 may act conditionally on receipt of both call backs 232 and 252. Following the comparison, the corresponding frames are then combined, e.g. either by the decoding controller 230 or via arithmetic performed in memory 216, to output the multi-layer reconstruction 238. In FIG. 2B, the multi-layer reconstruction 238 is then available for rendering, e.g. may be copied to a dedicated frame buffer of a display device. As described above, the frames of the first layer data 242 and the second layer data 224 may be matched by looking for timing metadata values that equal the timestamp values plus a configurable drift offset, e.g. $t_{MPB}$=PTS+offset.

Figure 3:
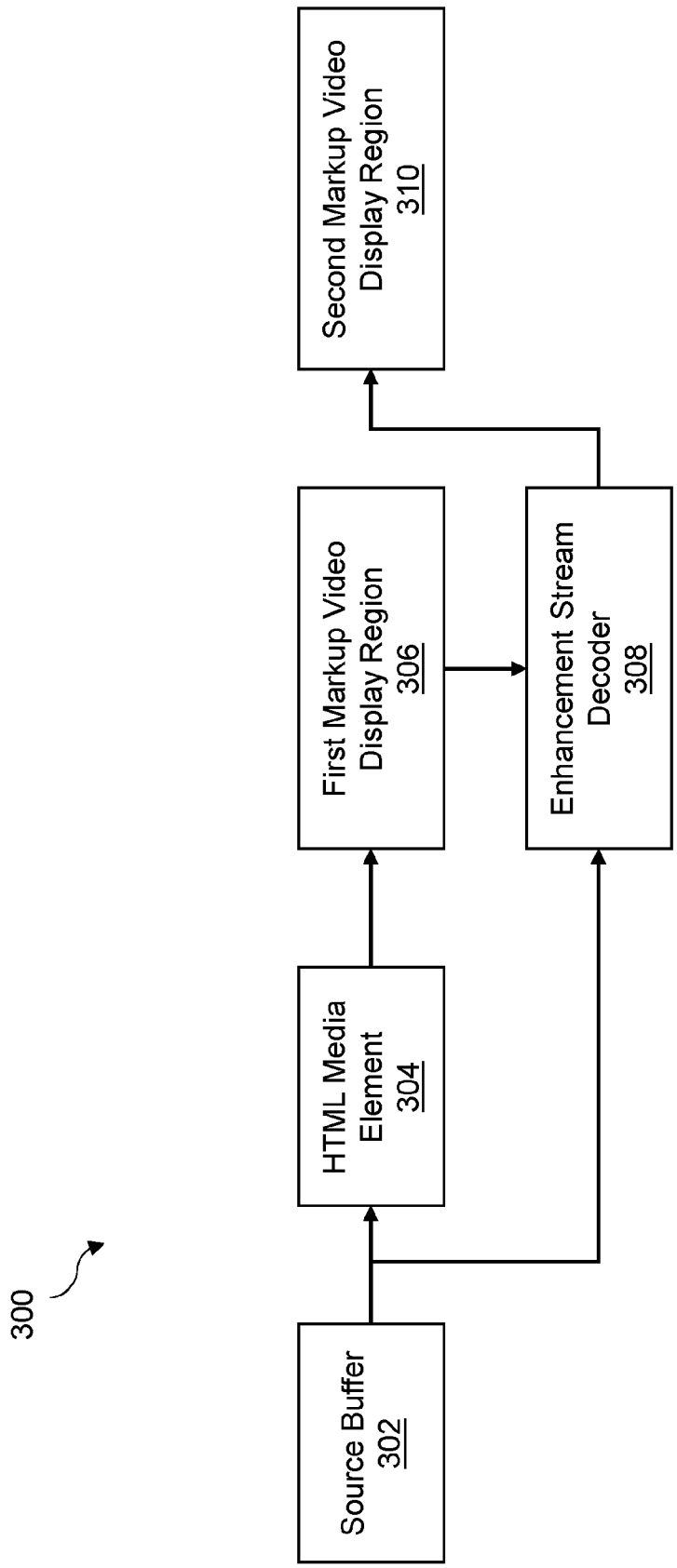
FIG. 3 is a schematic diagram showing an example browser implementation.

FIG. 3 is a schematic diagram of an example system 300 for decoding an encoded multi-layer video stream, such as an encoded multi-layer video stream encoded using LCEVC. The system 300 may implement one of the systems 200 and 240 in FIGS. 2A and 2B within a browser. The browser may be any browser capable of accessing information on the World Wide Web, examples of which include, but are not limited to, Google Chrome®, Microsoft Edge®, Safari®, Firefox® and Opera®. The browser may be implemented in a client device. Example client devices include, but are not limited to, mobile devices, computing devices, tablet devices, smart televisions, and so on. The client device comprises an operating system (OS) and the OS comprises the browser.

One function of the browser is to transform documents written in a markup scripting language (sometimes referred to as a markup language) into a visual representation of a webpage. The markup scripting language is used to control a display of data in a rendered webpage. The markup language may include a markup video element which in turn becomes a video display region when processed by the browser. For example, a user of the browser may navigate to a web page that includes an embedded video. When the browser renders the webpage, it receives data corresponding to the video. The browser may include resources necessary to decode and playback the video, so as to display the video to the user within a video display region rendered by the browser on a display of a client device, for example. Examples of a markup scripting language include any versions of Hypertext Markup Language (HTML), such as HTML5, and Extensible HyperText Markup Language (XHTML).

The markup video element, for example, indicates properties associated with display of the video in the webpage, for example the size of the video within the webpage and whether the video will autoplay upon loading of the webpage. The markup video element, for example, also includes an indication of the video coding format used to encode the video. This indicates to the browser which decoder(s) to use to decode the encoded video. The browser may then perform a call to at least one of a decoding function within the resources of the browser itself (which may be considered browser-native resources, which are native to the browser), or to a decoding function implemented in the OS, as discussed further below.

The system 300 of FIG. 3 comprises a source buffer 302 to receive an encoded multi-layer video stream. In this example, the source buffer 302 may receive, and be the source of, the first layer stream 202 and the second layer stream 204 in FIGS. 2A and 2B. In other examples, each stream may have a separate corresponding source buffer rather than a joint buffer for both streams. The source buffer is a section of memory, which is for example accessible to the browser. The source buffer may be a Media Source Extensions (MSE) application programming interface (API) SourceBuffer, for example. The encoded multi-layer video stream in this example comprises an encoded base stream and an encoded enhancement stream. The encoded base stream comprises video content encoded by any base encoder, also known as a compressor, such as an Advanced Video Coding (AVC), High Efficiency Video Coding (HEVC), VP9, MPEG-5 Essential Video Coding (EVC), or AOMedia Video 1 (AV1) encoder.

The system 300 further comprises an HTML media element 304, which implements a first layer (e.g., base stream) video decoder, also known as a base stream decompressor. The HTML media element 304 may instruct or otherwise implement a first layer video decoder 212 as described with reference to FIGS. 2A and 2B. In this example, the encoded base stream is extracted from the source buffer 302 and decoded using the HTML media element 304. The HTML media element 304 is a markup video element that provides an interface between the markup language and decoding resources. HTML5, for example, includes a markup video element that can be used to embed video content in a webpage. Another example is a JavaScript library that builds a custom set of controls over top of the HTML5 video element, which may be considered to function as a JavaScript player. It is to be appreciated that a markup video element such as the HTML5 video element can be modified by adding additional resources, such as a multi-layer video stream decoding library, a WebAssembly decoding library and/or a web worker function that can be accessed by the markup video element.

In a case, where LCEVC is used, the enhancement stream may be carried within a set of Supplemental Enhancement Information (SEI) messages that accompany and are associated with the base stream or within a separate network abstraction layer (NAL) unit stream, e.g. as carried within a PID stream as shown in FIG. 1. Base stream decoders may be configured to ignore SEI messages or a NAL unit stream if they contain information they cannot interpret, such as header information indicating a particular packet type. Hence, in this case, the HTML media element 304 may retrieve data relating to the base stream from the source buffer 302 in a default manner, wherein both enhanced and non-enhanced base streams are processed in a common manner. In this case, the HTML media element 304 may ignore SEI messages or NAL units that carry the enhancement stream that reside within the source buffer 302.

In certain implementations of the example system 300 of FIG. 3, the markup video element includes an indication to the video coding format associated with the encoded base stream. The markup video element, when processed by the browser, locates the appropriate base stream decoder associated with the video coding format, and decodes the encoded base stream. The HTML media element 304 may be implemented within the browser, using functionality of the OS of a client device comprising the browser, or utilising resources of both the browser and the OS. For example, the OS may utilise hardware acceleration to decode the encoded base stream which can reduce power consumption and the number of computations performed by a CPU compared to software-only decoding.

The decoded base stream is rendered in a first markup video display region 306. The first markup video display region 306, for example, corresponds to a region of the webpage at which it is desired to display a video. The first markup video display region 306 may comprise a <video> tag display region. The rendering of the decoded base stream allows access to the base stream video data, e.g. decoded frames of the base encoded video. By rendering the base stream video data, the base stream video data is accessible to other decoding processes within the browser, e.g. even if the decoding of the base stream is performed by an inaccessible or protected method. In the present case, the HTML media element 304 may provide an option of registering a call-back when a frame of first-layer decoded data is ready, e.g. as indicated by 232 in FIGS. 2A and 2B.

The rendered decoded base stream is subsequently combined with a decoded enhancement stream to generate a reconstructed video stream. In certain cases, as the rendered base stream does not include enhancement data from the enhancement stream at this point, the markup video display region is hidden. This ensures that the rendered video content corresponding to the base stream is not displayed in the webpage and so is not visible to a viewer of the webpage. However, in certain cases, there may be a user option to view this content. Rendering the decoded base stream ensures that the system 300 can still decode and render video streams that are not encoded using a multi-layer video coding format, e.g. if this is the case, the markup video display region may be set as visible and the decoded base stream may be displayed as per comparative non-enhancement video rendering. For example, if the webpage included a single-layer video stream that lacked an enhancement stream, the system 300 of FIG. 3 could be used to display the decoded single-layer video stream, e.g. by unhiding the first markup video display region 306.

The system 300 further comprises an enhancement stream decoder 308. The enhancement stream decoder 308 may implement functionality of one or more of the second layer video decoder 214 and the decoding controller 230 described with reference to FIGS. 2A and 2B. In the present case, the source buffer 302, which may comprise a MSE component, issues a call-back to indicate that data is ready for decoding. This call-back may be received by the enhancement stream decoder 308 (e.g., the enhancement stream decoder 308 may register for this call-back as part of an initial configuration). On receipt of the call-back, the encoded enhancement stream is extracted from the source buffer 302 and decoded by the enhancement stream decoder 308. For example, the enhancement stream decoder 308 may retrieve the encoded enhancement stream from data for a set of SEI messages or a portion of a PID stream that is stored within the source buffer 302. In certain cases, the enhancement stream decoder 308 may obtain both the first layer and the second layer streams (i.e., base and enhancement streams), demultiplex the two streams and then discard the first layer stream (e.g., as this is being obtained and decoded by way of the HTML media element 304). At this stage, a timestamp may be obtained by way of sourcing the combined stream from the source buffer 302. For example, a PTS time stamp may be obtained from the base stream or from the source buffer call-back.

In the example of FIG. 3, the enhancement stream decoder 308 also obtains the decoded base stream from the first markup video display region 306 and combines the decoded base stream with the decoded enhancement stream to generate a reconstructed video stream. The reconstructed video stream may then be rendered in a second markup video display region 310 within the webpage that is visible to a viewer of the webpage. The second markup video display region 310 may comprise a <canvas> tag display region. In the present example, the enhancement stream decoder 308 receives a call-back from the first markup video display region 306 when a frame of the base (i.e., first layer) stream is ready. This may comprise a requestVideoFrame call-back. When the enhancement stream decoder 308 obtains the call-back from the first markup video display region 306, it obtains timing metadata for the base frame as discussed above. For example, the timing metadata may comprise a "media time" variable or a current playback time that is provided with the frame that is rendered in the first markup video display region 306. As described above, the enhancement stream decoder 308 then compares this timing metadata with the originally sourced timestamp to pair first-layer decoded data for the frame with second-layer decoded data for the frame. The combined paired data is then rendered in the second markup video display region 310 as an enhanced frame.

The enhancement stream decoder 308 may be a multi-layer video stream decoder plugin (DPI) such as an LCEVC decoder plugin, configured to decode an LCEVC-encoded video stream. The enhancement stream decoder 308 may provide the decoding capabilities of the second layer decoder 214 and the control capabilities of the decoding controller 230 as described with reference to FIGS. 2A and 2B. The enhancement stream decoder 108 may comprise a single component or two separate components depending on the implementation, with the same functional effect. One or more components of the system 300 may be implemented in a browser. In one example, a browser is provided comprising the enhancement stream decoder 308.

Figure 3A:
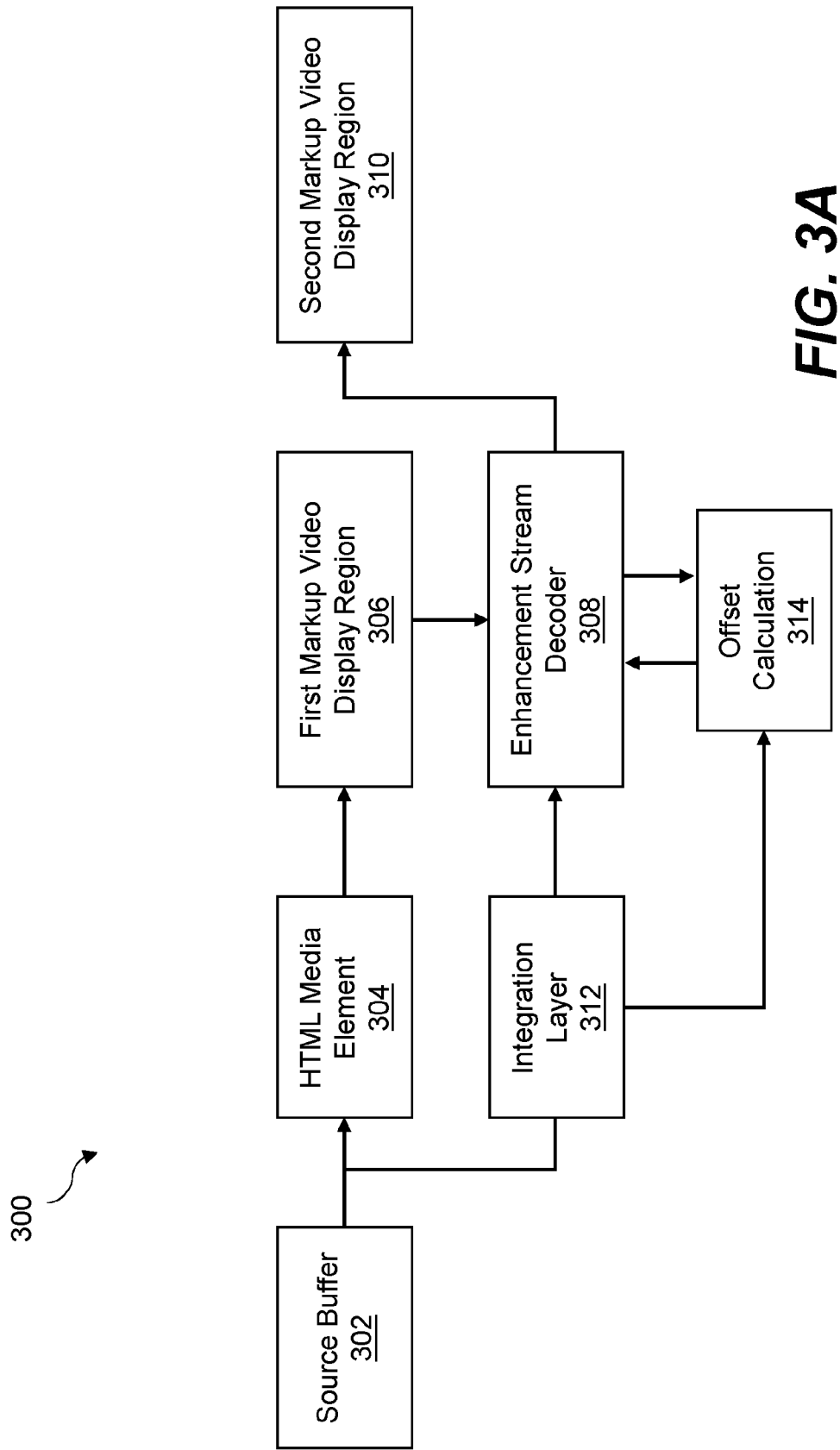

FIG. 3A is a schematic diagram of an alternative exemplary system 300 for decoding an encoded multi-layer video stream, such as an encoded multi-layer video stream encoded using LCEVC. Components and features common to those of FIG. 3 function in the same way as previously described and so will not be described again in detail.

As before, the system 300 of FIG. 3A comprises a source buffer 302 to receive an encoded multi-layer video stream, for example the first layer stream 202 and the second layer stream 204 in FIGS. 2A and 2B. The encoded base stream is extracted from the source buffer 302 and decoded using the HTML media element 304. The decoded base stream is rendered in a first markup video display region 306.

The source buffer 302 issues a call-back to indicate that data is ready for decoding and the call-back is received by the enhancement stream decoder 308. On receipt of the call-back, the encoded enhancement stream is extracted from the source buffer 302 and decoded by the enhancement stream decoder 308. A timestamp, e.g. a PTS time stamp, is obtained from the base stream or from the source buffer call-back.

The enhancement stream decoder 308 also obtains the decoded base stream from the first markup video display region 306 and combines the decoded base stream with the decoded enhancement stream to generate a reconstructed video stream. The reconstructed video stream is then be rendered in a second markup video display region 310.

As previously discussed, when LCEVC is used, the enhancement stream extracted from the source buffer 302 is carried within a set of SEI messages that accompany and are associated with the base stream or within a separate NAL unit stream.

Base stream decoders are often configured to ignore SEI messages or a NAL unit stream if these contain information the base stream decoder cannot interpret. This means that the HTML media element 304 retrieves data relating to the base stream from the source buffer 302 in a default manner, wherein both enhanced and non-enhanced base streams are processed in a common manner. The HTML media element 304 ignores SEI messages or NAL units that carry the enhancement stream that reside within the source buffer 302.

As seen in FIG. 3A, the enhancement stream extracted from the source buffer 302, and carrying the set of SEI messages are first passed to an integration layer 312 before being passed to the enhancement stream decoder 308 for decoding.

In particular, the integration layer 312 extracts LCEVC data from the enhancement stream based on the type of source buffer. The extracted data can be NAL units with LCEVC data and a realtime transport protocol (RTP) timestamp or data appended to the source buffer from media source extensions. The LCEVC data is indexed using the PTS and stored for use when a corresponding base stream is to be matched and combined with the LCEVC data using the PTS. As before this is done by comparing timing metadata with the PTS and then the matched LCEVC data can be combined with the base stream to generate a reconstructed video stream. As shown in FIG. 3A, the relevant LCEVC data is passed to the enhancement stream decoder 308 along with an offset which is generated based on the environment of playback.

The offset is calculated by an offset calculation block 314 and can be done using two methods. The first method involves calculating the offset during the source buffer append and the second method involves calculating the offset during the enhancement stream decoding.

Using the first method, during the source buffer append, there are instances where data having the same timestamp gets appended to the source buffer more than once. In this case, the frame time is calculated based on the FPS of the enhancement stream and then this frame time is added to the provided timestamp the number of times the append was repeated. For example, if data was appended three times, the frame time is added to the provided timestamp three times. This is then used to store the LCEVC data used by the integration layer.

Using the second method, during the enhancement layer decoding, the offset is calculated based on one or more of the operating system, browser, player, and container format. The offset is then added to the timestamp provided by the video stream in order to fetch the relevant LCEVC data from the stored LCEVC data.

Figure 4:
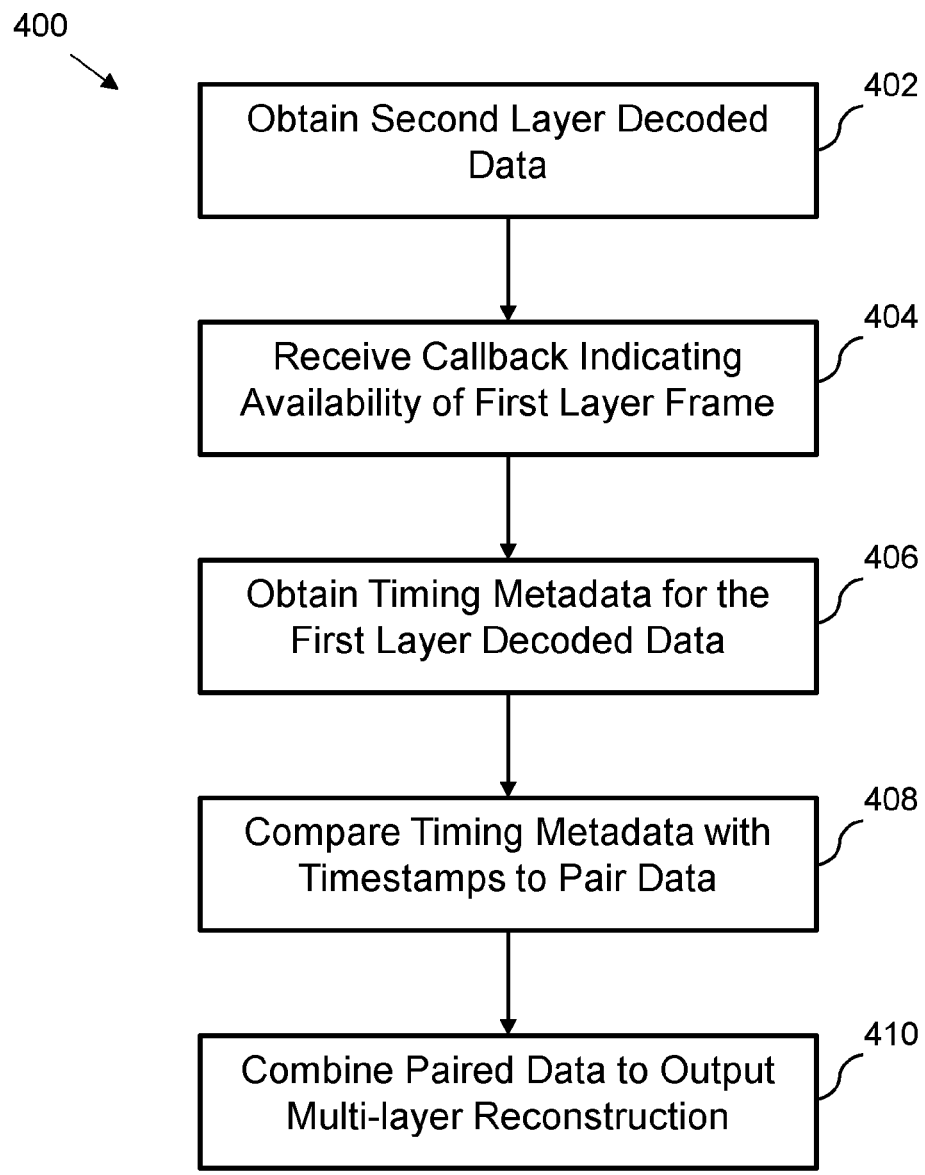
FIG. 4 is a flow diagram showing an example method of decoding a multi-layer video stream.

FIG. 4 shows an example method 400 of decoding a multi-layer video stream. The method 400 may be performed with one of the systems 200, 240, 300 of FIGS. 2A, 2B and 3 or, for example, may be implemented as a set of instructions that are executed by a processor. As in the examples above, the multi-layer video stream encodes a video signal and comprises at least a first layer and a second layer. The first layer is decoded using a first decoding method and the second layer is decoded using a second decoding method. The first decoding method uses data that is inaccessible to the second decoding method. For example, a PTS for decoded frames within a first layer of the multi-layer video stream may be available to the first decoding method but not available to the second decoding method, e.g. due to the use of secure or restricted internal data.

At block 402, the method comprises obtaining second-layer decoded data for the multi-layer video stream using the second decoding method. The second-layer decoded data relates to at least one frame of the video signal. For example, the second-layer decoded data may comprise residual or other augmentation data (such as watermarking data) for a frame of video. The second-layer decoded data is indexed using a timestamp derived from the multi-layer video stream. For example, the second decoding method, e.g. as implemented by a second-layer video decoder such as 214 in FIGS. 2A and 2B, may have access to the PTS from an incoming second layer stream, such as second layer stream 204 in FIGS. 2A and 2B, or PID stream 104 or PES 106 in FIG. 1. The second-layer decoded data may be obtained directly, e.g. may be received from a second-layer video decoder, or indirectly, e.g. may be accessed from shared memory. In one case, the second decoding method generates a call back to indicate that second-layer decoded data for successive frames is ready.

At block 404, the method 400 comprises receiving a call-back indicating an availability of first-layer decoded data for a frame of the first layer of the multi-layer video stream from the first decoding method. The call back may contain the first-layer decoded data or may indicate it is available from an accessible memory. The call back may be received from a video tag, such as a request for a video frame.

At block 406, the method 400 comprises obtaining timing metadata for the first-layer decoded data. The timing metadata is associated with a rendering of the frame for the first layer. For example, the timing metadata may comprise a media time for the frame derived from the first-layer decoded data or a current playback time for the frame derived from the first-layer decoded data. If the first decoding method decodes multiple frames in series and/or parallel (e.g., as they are received in the stream), then each decoded frame may have an associated time within the timing metadata. It should be noted that at this point the PTS timestamp for the first-layer decoded data is not output by the first decoding method, e.g. because it is only used internally within a secure method. Hence, to match the decoded frames of the first layer with decoded data for the second layer additional adaptations are required.

At block 408, the method 400 comprises comparing the timing metadata with one or more timestamps for the second-layer decoded data to pair the first-layer decoded data for the frame with second-layer decoded data for the frame. This may comprise determining whether a time value indicated in one of the timing metadata and the timestamps falls within a defined range of the other of the timing metadata and the timestamps. For example, the second-layer decoded data may comprise buffered second-layer decoded data for a series of frames, where each frame has a corresponding time value derived from a PTS from a PES 106 as shown in FIG. 1, and the first-layer decoded data may comprise buffered first-layer decoded data for a series of frames, where each frame has a corresponding time value derived from a timing metadata, such as a presentation time. In this case, block 408 comprises a fuzzy matching of the time values to match data for corresponding frames.

At block 410, the method 400 comprises combining the first-layer decoded data for the frame and the paired second-layer decoded data to output a reconstruction of the frame of the video signal. For example, this may comprise adding residual data from the second-layer decoded data to the first-layer decoded data for the frame. Residual data may be added at one or more spatial resolutions, e.g. a combination of residual data and a first-layer frame at a first resolution (e.g., Standard Definition—SD-or High Definition—HD) may be upsampled and then combined with further residual data at a second resolution (e.g., HD or Ultra-HD—UHD). Further details of reconstruction using residual data are described with reference to FIGS. 5 to 7 below.

In preferred cases, the method is repeated for each frame of the video signal, e.g. at 30 or 60 frames per second (fps) to allow the video signal to be viewed as a video. In certain cases, comparing the timing metadata with one or more timestamps for the second-layer decoded data further comprises searching for second-layer decoded data that has a timestamp that falls within a range defined with reference to a time indicated by the timing metadata. In this case, the range may be set based on the frame rate, e.g. to be smaller than a time resolution for the frame rate. The range may be set based on a configurable drift offset, where the drift offset may be configured based on the frame rate and/or a match tolerance. In certain cases, additional available data may be used to aid the matching, e.g. resource load, other time values output by the first decoding method, data received from an upstream demultiplexer etc.

In certain cases, the second-layer decoded data is stored in segments having a defined length in time, wherein each segment has a plurality of data groups with a start time and an end time, each data group representing data for a frame. These data groups may then be matched with a first-layer decoded frame based on the timing metadata.

In preferred examples, the first layer comprises a base video stream, and the second layer comprises an enhancement video stream, where the second layer "enhances" the first layer, e.g. improves resolution, provides sharper detail, removes compression artifacts etc. In these examples, the second-layer decoded data may comprise frames of residual data that are combined with frames derived from the base video stream. For example, the second layer may comprise a Low Complexity Enhancement Video Coding (LCEVC) video stream. In other cases, the second layer comprises a watermarking stream, where watermarking information is added to the first layer. The watermarking information may be visible or invisible, e.g. in the latter case incorporated as non-viewable metadata.

In certain cases, the call back at block 404 is received from the first decoding method, e.g. to indicate that a first-layer frame is ready for rendering. Block 402 may also be performed in response to a call back from the second decoding method, e.g. to indicate that a surface or frame of second-layer data is render for combination.

In certain cases, the first decoding method may be implemented by an operating system service. In this case, internal data used by the operating system service may be inaccessible to other processes outside of the operating system service, e.g. the service may operate within a protected kernel memory space that is not accessible to application level processes. The operating system service may use hardware acceleration to decode the first layer, e.g. use drivers and associated data that are only accessible to the operating system. The second decoding method may not form part of the operating system service but may represent an application-level process to improve a default or legacy decoding operation. Hence, the second decoding method may allow easy enhancement or upgrade of client devices with fixed operating systems or firmware.

In certain cases, the first decoding method may comprise rendering the reconstruction of the frame of the video signal within a browser element. For example, the methods and systems described herein may be used to render a multi-layer stream within a HyperText Markup Language (HTML) document, as rendered within an Internet browser. The HTML document may comprise an HTML5 document.

Although examples are described herein with reference to two layers, the approaches may be applied for more than two layers. For example, there may be one base layer and multiple higher layers of enhancement. Each layer of enhancement may be matched to the base layer as described herein.

In certain examples described herein the first layer stream and the second layer stream may be synchronised, e.g. a last packet for a picture in the second layer stream may be specified to arrive no later than a last packet for a corresponding picture in the first layer stream (e.g., where both pictures relate to the same underlying frame). In this case, a presentation timestamp (PTS) for the second layer may be taken from any one of the first and second layers.

In certain cases, a second layer decoder or a second layer decoding method may receive a stream with data for both layers. In this case, the second layer decoder or decoding method may discard the first layer data and decode the second layer data. However, the second layer decoder or decoding method may retain PTS values from data for the first layer.

In certain cases, the call back from the first layer decoder or first layer decoding method may indicate that a first layer frame is ready. The call back may provide frame metadata that includes a media time for the (first layer) frame. This media time may be used for the matching described above. If the media time is not available, then a current playback time, e.g. from a seek bar if rendered in a browser or media player, may be used as a fall back or replacement for the matching.

In certain cases, one or more of the example systems 200, 240, and 300 or method 400, may be implemented via instructions retrieved from a computer-readable medium that are executed by a processor of a decoding system, such as a client device.

Certain examples describe herein allow an upper layer of a multi-layer coding scheme to be efficiently decoded while keeping timing constraints imposed by a lower layer of the multi-layer coding scheme. The matching may be flexible, such that when a match is not possible or when second-layer decoded data is not available, the first layer frames are simply rendered without enhancement. If this only happens intermittently, it is often not perceptible.

Certain general information relating to example enhancement coding schemes will now be described. This information provides examples of specific multi-layer coding schemes.

It should be noted that examples are presented herein with reference to a signal as a sequence of samples (i.e., two-dimensional images, video frames, video fields, sound frames, etc.). For simplicity, non-limiting examples illustrated herein often refer to signals that are displayed as 2D planes of settings (e.g., 2D images in a suitable colour space), such as for instance a video signal. In a preferred case, the signal comprises a video signal. An example video signal is described in more detail with reference to FIG. 6. Although examples are described specifically in relation to video, the approaches may also be used for other forms of media such as audio or subtitle data.

The terms "picture", "frame" or "field" are used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of examples illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.). Although image or video coding examples are provided, the same approaches may be applied to signals with dimensions fewer than two (e.g., audio or sensor streams) or greater than two (e.g., volumetric signals).

In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal). In one case, a frame of a video signal may be seen to comprise a two-dimensional array with three colour component channels or a three-dimensional array with two spatial dimensions (e.g., of an indicated resolution—with lengths equal to the respective height and width of the frame) and one colour component dimension (e.g., having a length of 3). In certain cases, the processing described herein is performed individually to each plane of colour component values that make up the frame. For example, planes of pixel values representing each of Y, U, and V colour components may be processed in parallel using the methods described herein.

Certain examples described herein use a scalability framework that uses a base encoding and an enhancement encoding. The video coding systems described herein operate upon a received decoding of a base encoding (e.g., frame-by-frame or complete base encoding) and add one or more of spatial, temporal, or other quality enhancements via an enhancement layer. The base encoding may be generated by a base layer, which may use a coding scheme that differs from the enhancement layer, and in certain cases may comprise a legacy or comparative (e.g., older) coding standard.

Figure 5:
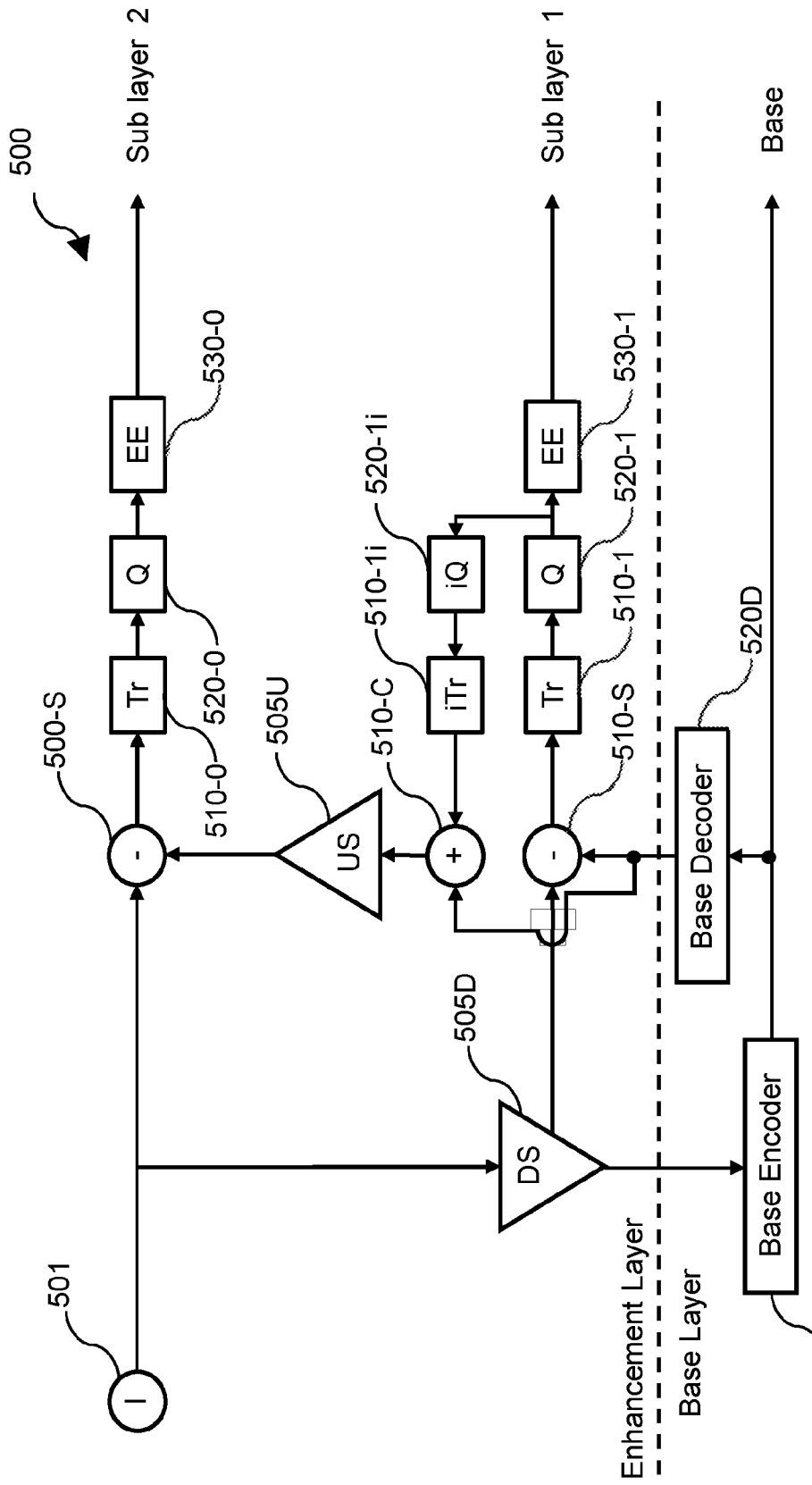
FIGS. 5 and 6 are schematic diagrams respectively showing an example multi-layer encoder and decoder configuration.
Figure 6:
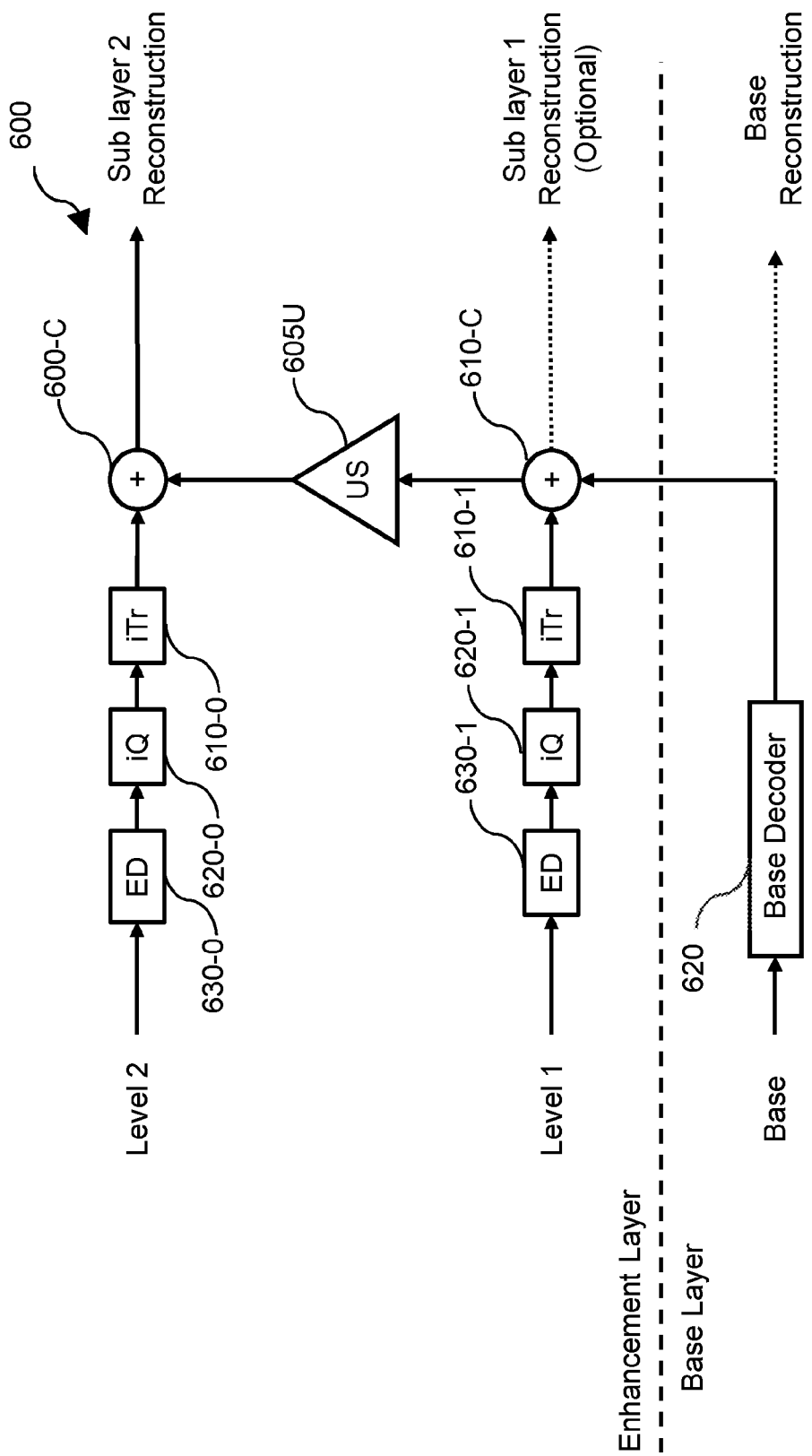
Figure 7:
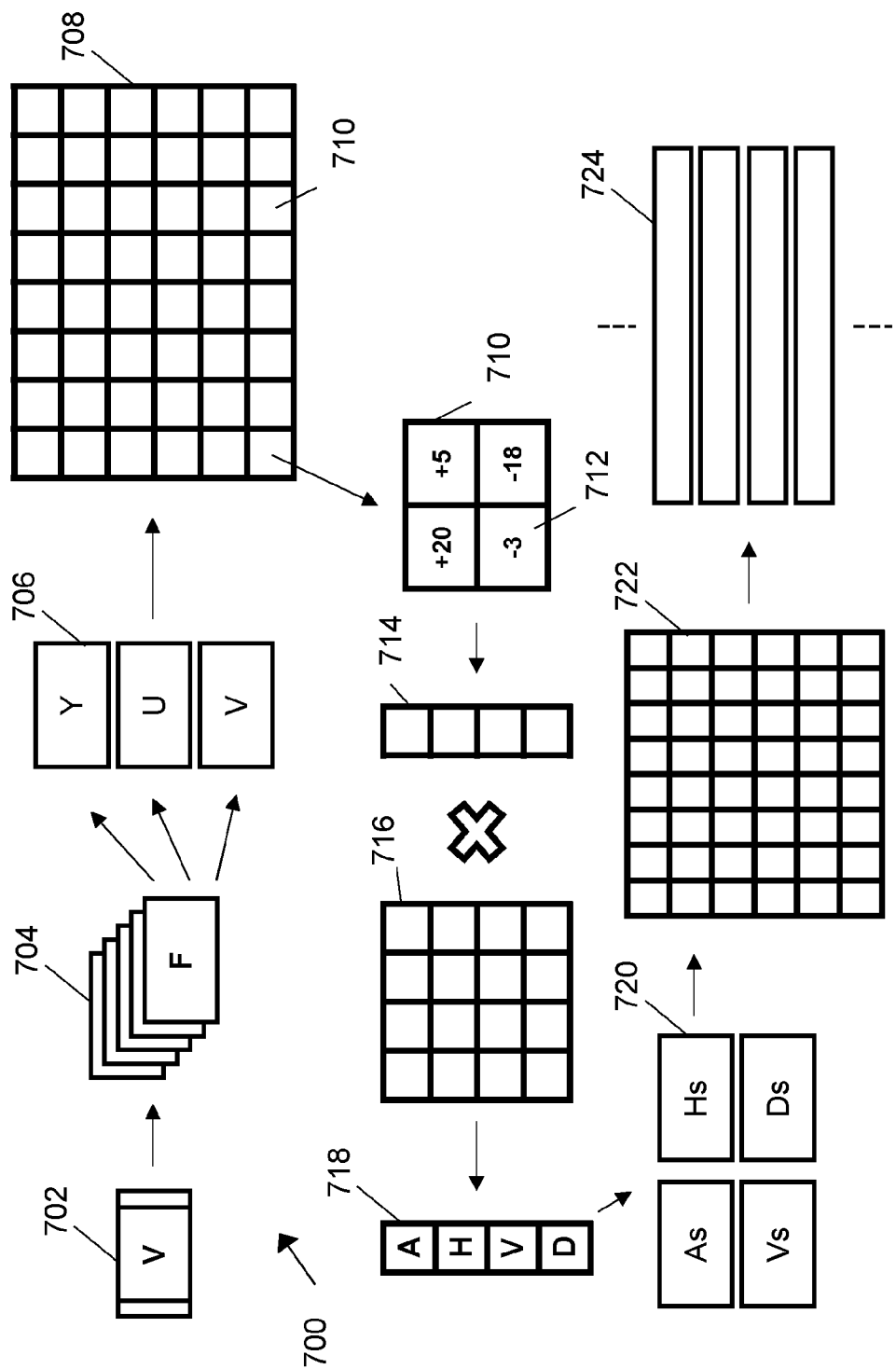
FIG. 7 is a schematic diagram showing certain data processing operations performed by an example multi-layer encoder.

FIGS. 5 to 7 show a spatially scalable coding scheme that uses a down-sampled source signal encoded with a base codec, adds a first level of correction or enhancement data to the decoded output of the base codec to generate a corrected picture, and then adds a further level of correction or enhancement data to an up-sampled version of the corrected picture. Thus, the spatially scalable coding scheme may generate an enhancement stream with two spatial resolutions (higher and lower), which may be combined with a base stream at the lower spatial resolution.

In the spatially scalable coding scheme, the methods and apparatuses may be based on an overall algorithm which is built over an existing encoding and/or decoding algorithm (e.g., MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

FIG. 5 shows a system configuration for an example spatially scalable encoding system 500. The encoding process is split into two halves as shown by the dashed line. Each half may be implemented separately. Below the dashed line is a base level and above the dashed line is the enhancement level, which may usefully be implemented in software. The encoding system 500 may comprise only the enhancement level processes, or a combination of the base level processes and enhancement level processes as needed. The encoding system 500 topology at a general level is as follows. The encoding system 500 comprises an input I for receiving an input signal 501. The input I is connected to a down-sampler 505D. The down-sampler 505D outputs to a base encoder 520E at the base level of the encoding system 500. The down-sampler 505D also outputs to a residual generator 510-S. An encoded base stream is created directly by the base encoder 520E, and may be quantised and entropy encoded as necessary according to the base encoding scheme. The encoded base stream may be the base layer as described above, e.g. a lowest layer in a multi-layer coding scheme.

Above the dashed line is a series of enhancement level processes to generate an enhancement layer of a multi-layer coding scheme. In the present example, the enhancement layer comprises two sub-layers. In other example, one or more sub-layers may be provided. In FIG. 5, to generate an encoded sub-layer 1 enhancement stream, the encoded base stream is decoded via a decoding operation that is applied at a base decoder 520D. In preferred examples, the base decoder 520D may be a decoding component that complements an encoding component in the form of the base encoder 520E within a base codec. In other examples, the base decoding block 520D may instead be part of the enhancement level. Via the residual generator 510-S, a difference between the decoded base stream output from the base decoder 520D and the down-sampled input video is created (i.e., a subtraction operation 510-S is applied to a frame of the down-sampled input video and a frame of the decoded base stream to generate a first set of residuals). Here, residuals represent the error or differences between a reference signal or frame and a desired signal or frame. The residuals used in the first enhancement level can be considered as a correction signal as they are able to 'correct' a frame of a future decoded base stream. This is useful as this can correct for quirks or other peculiarities of the base codec. These include, amongst others, motion compensation algorithms applied by the base codec, quantisation and entropy encoding applied by the base codec, and block adjustments applied by the base codec.

In FIG. 5, the first set of residuals are transformed, quantised and entropy encoded to produce the encoded enhancement layer, sub-layer 1 stream. In FIG. 5, a transform operation 510-1 is applied to the first set of residuals; a quantisation operation 520-1 is applied to the transformed set of residuals to generate a set of quantised residuals; and, an entropy encoding operation 530-1 is applied to the quantised set of residuals to generate the encoded enhancement layer, sub-layer 1 stream (e.g., at a first level of enhancement). However, it should be noted that in other examples only the quantisation step 520-1 may be performed, or only the transform step 510-1. Entropy encoding may not be used, or may optionally be used in addition to one or both of the transform step 510-1 and quantisation step 520-1. The entropy encoding operation can be any suitable type of entropy encoding, such as a Huffmann encoding operation or a run-length encoding (RLE) operation, or a combination of both a Huffmann encoding operation and a RLE operation (e.g., RLE then Huffmann or prefix encoding).

To generate the encoded enhancement layer, sub-layer 2 stream, a further level of enhancement information is created by producing and encoding a further set of residuals via residual generator 500-S. The further set of residuals are the difference between an up-sampled version (via up-sampler 505U) of a corrected version of the decoded base stream (the reference signal or frame), and the input signal 501 (the desired signal or frame).

To achieve a reconstruction of the corrected version of the decoded base stream as would be generated at a decoder (e.g., as shown in FIG. 6), at least some of the sub-layer 1 encoding operations are reversed to mimic the processes of the decoder, and to account for at least some losses and quirks of the transform and quantisation processes. To this end, the first set of residuals are processed by a decoding pipeline comprising an inverse quantisation block 520-1$i$ and an inverse transform block 510-1$i$. The quantised first set of residuals are inversely quantised at inverse quantisation block 520-1$i$ and are inversely transformed at inverse transform block 510-1$i$ in the encoding system 500 to regenerate a decoder-side version of the first set of residuals. The decoded base stream from decoder 520D is then combined with the decoder-side version of the first set of residuals (i.e., a summing operation 510-C is performed on the decoded base stream and the decoder-side version of the first set of residuals). Summing operation 510-C generates a reconstruction of the down-sampled version of the input video as would be generated in all likelihood at the decoder—i.e. a reconstructed base codec video). The reconstructed base codec video is then up-sampled by up-sampler 505U. Processing in this example is typically performed on a frame-by-frame basis. Each colour component of a frame may be processed as shown in parallel or in series.

The up-sampled signal (i.e., reference signal or frame) is then compared to the input signal 501 (i.e., desired signal or frame) to create the further set of residuals (i.e., a difference operation is applied by the residual generator 500-S to the up-sampled re-created frame to generate a further set of residuals). The further set of residuals are then processed via an encoding pipeline that mirrors that used for the first set of residuals to become an encoded enhancement layer, sub-layer 2 stream (i.e., an encoding operation is then applied to the further set of residuals to generate the encoded further enhancement stream). In particular, the further set of residuals are transformed (i.e., a transform operation 510-0 is performed on the further set of residuals to generate a further transformed set of residuals). The transformed residuals are then quantised, and entropy encoded in the manner described above in relation to the first set of residuals (i.e., a quantisation operation 520-0 is applied to the transformed set of residuals to generate a further set of quantised residuals; and, an entropy encoding operation 530-0 is applied to the quantised further set of residuals to generate the encoded enhancement layer, sub-layer 2 stream containing the further level of enhancement information). In certain cases, the operations may be controlled, e.g. such that, only the quantisation step 520-1 may be performed, or only the transform and quantisation step. Entropy encoding may optionally be used in addition. Preferably, the entropy encoding operation may be a Huffmann encoding operation or a run-length encoding (RLE) operation, or both (e.g., RLE then Huffmann encoding). The transformation applied at both blocks 510-1 and 510-0 may be a Hadamard transformation that is applied to 2×2 or 4×4 blocks of residuals.

The encoding operation in FIG. 5 does not result in dependencies between local blocks of the input signal (e.g., in comparison with many known coding schemes that apply inter or intra prediction to macroblocks and thus introduce macroblock dependencies). Hence, the operations shown in FIG. 5 may be performed in parallel on 4×4 or 2×2 blocks, which greatly increases encoding efficiency on multicore central processing units (CPUs) or graphical processing units (GPUs).

As illustrated in FIG. 5, the output of the spatially scalable encoding process is one or more enhancement streams for an enhancement layer which preferably comprises a first level of enhancement and a further level of enhancement. This is then combinable (e.g., via multiplexing or otherwise) with a base stream at a base level, e.g. into the Transport Stream 102 as described above or as multiple tracks within another digital container. The first level of enhancement (sub-layer 1) may be considered to enable a corrected video at a base level, that is, for example to correct for encoder quirks. The second level of enhancement (sub layer 2) may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 510-1 and the quantisation operation 520-1.

FIG. 6 shows a corresponding example decoding system 600 for the example spatially scalable coding scheme. The enhancement layer processing shown above the dotted line may be implemented by the second layer decoder as described herein, e.g. the second layer decoder 214 and the decoding controller 230 of FIG. 2A or 2B, or the enhancement stream decoder 308 of FIG. 3. The base layer processing shown below the dotted line may be implemented by the first layer decoder as described herein, e.g. the first layer decoder 212 of FIGS. 2A and 2B or via the HTML media element 304 of FIG. 3.

In FIG. 6, the encoded base stream is decoded at base decoder 620 in order to produce a base reconstruction of the input signal 501. This base reconstruction may be used in practice to provide a viewable rendition of the signal 501 at the lower quality level. However, the primary purpose of this base reconstruction signal is to provide a base for a higher quality rendition of the input signal 501. To this end, the decoded base stream is provided for enhancement layer, sub-layer 1 processing (i.e., sub-layer 1 decoding). Sub-layer 1 processing in FIG. 6 comprises an entropy decoding process 630-1, an inverse quantisation process 620-1, and an inverse transform process 610-1. Optionally, only one or more of these steps may be performed depending on the operations carried out at corresponding block 500-1 at the encoder. By performing these corresponding steps, a decoded enhancement layer, sub-layer 1 stream comprising the first set of residuals is made available at the decoding system 600. The first set of residuals is combined with the decoded base stream from base decoder 620 (i.e., a summing operation 610-C is performed on a frame of the decoded base stream and a frame of the decoded first set of residuals to generate a reconstruction of the down-sampled version of the input video—i.e. the reconstructed base codec video). A frame of the reconstructed base codec video is then up-sampled by up-sampler 605U.

Additionally, and optionally in parallel, the encoded enhancement layer, sub-layer 2 stream is processed to produce a decoded further set of residuals. Similar to sub-layer 1 processing, enhancement layer, sub-layer 2 processing comprises an entropy decoding process 630-0, an inverse quantisation process 620-0 and an inverse transform process 610-0. Of course, these operations will correspond to those performed at block 500-0 in encoding system 500, and one or more of these steps may be omitted as necessary. Block 600-0 produces a decoded enhancement layer, sub-layer 2 stream comprising the further set of residuals, and these are summed at operation 600-C with the output from the up-sampler 605U in order to create an enhancement layer, sub-layer 2 reconstruction of the input signal 501, which may be provided as the output of the decoding system 600. Thus, as illustrated in FIGS. 5 and 6, the output of the decoding process may comprise up to three outputs: a base reconstruction, a corrected lower resolution signal and an original signal reconstruction for the multi-layer coding scheme at a higher resolution.

With reference to the examples 200 and 240 of FIGS. 2A and 2B, the residual "decoding" processes 610, 620, 630 may be performed by the second layer decoder 214, wherein the two sub-layers are provided as part of the enhancement layer NAL units. With reference to the example 300 of FIG. 3, the "decoding" processes 610, 620, 630 may be performed by the enhancement stream decoder 308, where the base and enhancement layer data is retrieved from the source buffer 302.

In general, examples described herein operate within encoding and decoding pipelines that comprises at least a transform operation. The transform operation may comprise the DCT or a variation of the DCT, a Fast Fourier Transform (FFT), or, in preferred examples, a Hadamard transform as implemented by LCEVC. The transform operation may be applied on a block-by-block basis. For example, an input signal may be segmented into a number of different consecutive signal portions or blocks and the transform operation may comprise a matrix multiplication (i.e., linear transformation) that is applied to data from each of these blocks (e.g., as represented by a 1D vector). In this description and in the art, a transform operation may be said to result in a set of values for a predefined number of data elements, e.g. representing positions in a resultant vector following the transformation. These data elements are known as transformed coefficients (or sometimes simply "coefficients").

As described herein, where the enhancement data comprises residual data, a reconstructed set of coefficient bits may comprise transformed residual data, and a decoding method may further comprise instructing a combination of residual data obtained from the further decoding of the reconstructed set of coefficient bits with a reconstruction of the input signal generated from a representation of the input signal at a lower level of quality to generate a reconstruction of the input signal at a first level of quality. The representation of the input signal at a lower level of quality may be a decoded base signal and the decoded base signal may be optionally upscaled before being combined with residual data obtained from the further decoding of the reconstructed set of coefficient bits, the residual data being at a first level of quality (e.g., a first resolution). Decoding may further comprise receiving and decoding residual data associated with a second sub-layer, e.g. obtaining an output of the inverse transformation and inverse quantisation component, and combining it with data derived from the aforementioned reconstruction of the input signal at the first level of quality. This data may comprise data derived from an upscaled version of the reconstruction of the input signal at the first level of quality, i.e. an upscaling to the second level of quality.

Further details and examples of a two sub-layer enhancement encoding and decoding system may be obtained from published LCEVC documentation. Although examples have been described with reference to a tier-based hierarchical coding scheme in the form of LCEVC, the methods described herein may also be applied to other tier-based hierarchical coding scheme, such as VC-6: SMPTE VC-6

ST-2117 as described in PCT/GB2018/053552 and/or the associated published standard document, which are both incorporated by reference herein.

FIG. 7 shows an example 700 of how a video signal may be decomposed into different components and then encoded. In the example of FIG. 7, a video signal 702 is encoded. The video signal 702 comprises a plurality of frames or pictures 704, e.g. where the plurality of frames represent action over time. In this example, each frame 704 is made up of three colour components. The colour components may be in any known colour space. In FIG. 7, the three colour components 706 are Y (luma), U (a first chroma opponent colour) and V (a second chroma opponent colour). Each colour component may be considered a plane 708 of values. The plane 708 may be decomposed into a set of n by n blocks of signal data 710. For example, in LCEVC, n may be 2 or 4; in other video coding technologies n may be 8 to 32.

In LCEVC and certain other coding technologies, a video signal fed into a base layer is a downscaled version of the input video signal, e.g. 501. In this case, the signal that is fed into both sub-layers of the enhancement layer comprises a residual signal comprising residual data. A plane of residual data may also be organised in sets of n-by-n blocks of signal data 710. The residual data may be generated by comparing data derived from the input signal being encoded, e.g. the video signal 501, and data derived from a reconstruction of the input signal, the reconstruction of the input signal being generated from a representation of the input signal at a lower level of quality. The comparison may comprise subtracting the reconstruction from the downsampled version. The comparison may be performed on a frame-by-frame (and/or block-by-block) basis. The comparison may be performed at the first level of quality; if the base level of quality is below the first level of quality, a reconstruction from the base level of quality may be upscaled prior to the comparison. In a similar manner, the input signal to the second sub-layer, e.g. the input for the second sub-layer transformation and quantisation component, may comprise residual data that results from a comparison of the input video signal 501 at the second level of quality (which may comprise a full-quality original version of the video signal) with a reconstruction of the video signal at the second level of quality. As before, the comparison may be performed on a frame-by-frame (and/or block-by-block) basis and may comprise subtraction. The reconstruction of the video signal may comprise a reconstruction generated from the decoded decoding of the encoded base bitstream and a decoded version of the first sub-layer residual data stream. The reconstruction may be generated at the first level of quality and may be upsampled to the second level of quality.

Hence, a plane of data 708 for the first sub-layer may comprise residual data that is arranged in n-by-n signal blocks 710. One such 2 by 2 signal block is shown in more detail in FIG. 7 (n is selected as 2 for ease of explanation) where for a colour plane the block may have values 712 with a set bit length (e.g., 8 or 16-bit). Each n-by-n signal block may be represented as a flattened vector 714 of length $n^2$ representing the blocks of signal data. To perform the transform operation, the flattened vector 714 may be multiplied by a transform matrix 716 (i.e., the dot product taken). This then generates another vector 718 of length $n^2$ representing different transformed coefficients for a given signal block 710. FIG. 7 shows an example similar to LCEVC where the transform matrix 716 is a Hadamard matrix of size 4 by 4, resulting in a transformed coefficient vector 718 having four elements with respective values. These elements are sometimes referred to by the letters A, H, V and D as they may represent an average, horizontal difference, vertical difference and diagonal difference. Such a transform operation may also be referred to as a directional decomposition. When n=4, the transform operation may use a 16 by 16 matrix and be referred to as a directional decomposition squared.

As shown in FIG. 7, the set of values for each data element across the complete set of signal blocks 710 for the plane 708 may themselves be represented as a plane or surface of coefficient values 720. For example, values for the "H" data elements for the set of signal blocks may be combined into a single plane, where the original plane 708 is then represented as four separate coefficient planes 722. For example, the illustrated coefficient plane 722 contains all the "H" values. These values are stored with a predefined bit length, e.g. a bit length B, which may be 8, 16, 32 or 64 depending on the bit depth. A 16-bit example is considered below but this is not limiting. As such, the coefficient plane 722 may be represented as a sequence (e.g., in memory) of 16-bit or 2-byte values 724 representing the values of one data element from the transformed coefficients. These may be referred to as coefficient bits. These coefficient bits may be quantised and then entropy encoded as discussed to then generate the encoded enhancement or second layer data as described above.

The techniques described herein may be implemented in software or hardware, or using a combination. The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of decoding a multi-layer video stream, the multi-layer video stream encoding a video signal and comprising at least a first layer and a second layer, the first layer being decoded using a first decoding method and the second layer being decoded using a second decoding method, the first decoding method using data that is inaccessible to the second decoding method, the method comprising:

obtaining second-layer decoded data for the multi-layer video stream using the second decoding method, the second-layer decoded data relating to at least one frame of the video signal, the second-layer decoded data being indexed using a timestamp derived from the multi-layer video stream;

receiving a call-back indicating an availability of first-layer decoded data for a frame of the first layer of the multi-layer video stream from the first decoding method;

obtaining timing metadata for the first-layer decoded data, the timing metadata being associated with a rendering of the frame for the first layer;

comparing the timing metadata with one or more timestamps for the second-layer decoded data to pair the first-layer decoded data for the frame with second-layer decoded data for the frame; and combining the first-layer decoded data for the frame and the paired second-layer decoded data for the frame to output a multi-layer reconstruction of the frame of the video signal; and wherein the method is implemented within a browser, the timestamp is obtained from data for the multi-layer video stream that is retrieved from a source buffer prior to decoding, the first decoding method comprises rendering the first-layer decoded data in a first markup video display region, the call-back indicating an availability of first-layer decoded data is received from the first markup video display region, and the second decoding method comprises rendering the reconstruction of the frame of the video signal in a second markup video display region.

2. The method of claim 1, wherein the method is repeated for each frame of the video signal.

3. The method of claim 1, wherein the timing metadata comprises one of:
a media time for the frame derived from the first-layer decoded data; or a current playback time for the frame derived from the first-layer decoded data.

4. The method of claim 1, wherein comparing the timing metadata with one or more timestamps for the second-layer decoded data further comprises:
searching for second-layer decoded data that has a timestamp that falls within a range defined with reference to a time indicated by the timing metadata.

5. The method of claim 4, wherein the range is set based on a configurable drift offset, wherein the configurable drift offset is based on a framerate of the rendering.

6. The method of claim 5, comprising:
searching for second-layer decoded data where the timestamp of the second-layer decoded data plus the configurable drift offset equals a time indicated within the timing metadata.

7. The method of claim 1, wherein the second-layer decoded data is stored in segments having a defined length in time, wherein each segment has a plurality of data groups with a start time and an end time, each data group representing data for a frame.

8. The method of claim 1, wherein:
the first layer comprises a base video stream, and
the second layer comprises an enhancement video stream, wherein the second-layer decoded data comprises frames of residual data that are combined with frames derived from the base video stream.

9. The method of claim 8, wherein the second layer comprises a Low Complexity Enhancement Video Coding (LCEVC) video stream,
wherein before obtaining second-layer decoded data, the method comprises:
passing the LCEVC video stream to an integration layer;
extracting LCEVC data from the LCEVC video stream, wherein the LCEVC data comprises a timestamp from the LCEVC video stream;
indexing LCEVC data using the timestamp from the LCEVC video stream.

10. The method of claim 1, wherein the first decoding method is implemented by an operating system service, internal data used by the operating system service being inaccessible to other processes outside of the operating system service.

11. The method of claim 1, wherein the timing metadata is generated by the first-layer decoder, and wherein the timing metadata is provided as part of the call-back.

12. The method of claim 1, wherein the second-layer decoded data is in the form of residual data for the frame and the reconstruction is an enhanced frame of the video signal.

13. The method of claim 1, wherein the comparing comprises querying the second-layer decoded data to look for a match between a timestamp stored with each frame of the second- layer decoded data and the timing metadata associated with the first-layer decoder data.

14. The method of claim 1, wherein the frames of first-layer decoded data are indexed using the timing metadata and the frames of the second-layer decoded data are indexed using the timestamp from the second layer stream.

15. A system for decoding a multi-layer video stream, the multi-layer video stream encoding a video signal and comprising at least a first layer and a second layer, comprising:
a second-layer decoder to decode the second layer of the multi-layer video stream; a memory to store an output of the second-layer decoder, said output being indexed using a timestamp derived from the multi-layer video stream; and
a decoding controller communicatively coupled to a first-layer decoder, the first-layer decoder using data that is inaccessible to the second-layer decoder, the decoding controller being configured to:
receive a call-back indicating an availability of first-layer decoded data from the first-layer decoder for a frame of the first layer;
obtain timing metadata for the first-layer decoded data, the timing metadata being associated with a rendering of the frame for the first layer;
compare the timing metadata with one or more timestamps for the output of the second-layer decoder to pair the first-layer decoded data for the frame with second-layer decoded data for the frame; and
combine the first-layer decoded data for the frame and the paired second-layer decoded data to output a multi-layer reconstruction of the frame of the video signal; and
wherein:
the first-layer decoder outputs the first-layer decoded data to a first markup video display region of a browser; and
the second-layer decoder receives the call-back from the first markup video display region of a browser and outputs the reconstruction of the frame of the video signal in a second markup video display region of the browser.

16. The system of claim 15, wherein the timestamp comprises a presentation timestamp and the timing metadata comprises one of:
a media time for the frame derived from the first-layer decoded data; or
a current playback time for the frame derived from the first-layer decoded data.

17. The system of claim 15, wherein the decoding controller is configured to search for second-layer decoded data that has a timestamp that falls within a range defined with reference to a time indicated by the timing metadata, the range being set based on a configurable drift offset.

18. The system of claim 15, wherein the first-layer decoder is a base decoder, and the second-layer decoder is an enhancement decoder, wherein the second-layer decoded data comprises one or more of:
residual data for frames of reconstructed video; and
watermarking data for frames of reconstructed video.

19. The system of claim 15, wherein the second-layer decoder is a Low Complexity Enhancement Video Coding (LCEVC) decoder and wherein an integration layer is communicatively coupled to the LCEVC decoder.

20. A non-transitory computer-readable medium having stored thereon computer executable instructions which, when executed by a processor, cause the processor to decode a multi-layer video stream, the multi-layer video stream encoding a video signal and comprising at least a first layer and a second layer, the first layer being decoded using a first decoding method and the second layer being decoded using a second decoding method, the first decoding method using data that is inaccessible to the second decoding method, the processor caused to perform the following:

obtaining second-layer decoded data for the multi-layer video stream using the second decoding method, the second-layer decoded data relating to at least one frame of the video signal, the second-layer decoded data being indexed using a timestamp derived from the multi-layer video stream;

receiving a call-back indicating an availability of first-layer decoded data for a frame of the first layer of the multi-layer video stream from the first decoding method;

obtaining timing metadata for the first-layer decoded data, the timing metadata being associated with a rendering of the frame for the first layer;

comparing the timing metadata with one or more timestamps for the second-layer decoded data to pair the first-layer decoded data for the frame with second-layer decoded data for the frame; and combining the first-layer decoded data for the frame and the paired second-layer decoded data for the frame to output a multi-layer reconstruction of the frame of the video signal; and wherein the method is implemented within a browser, the timestamp is obtained from data for the multi-layer video stream that is retrieved from a source buffer prior to decoding, the first decoding method comprises rendering the first-layer decoded data in a first markup video display region, the call-back indicating an availability of first-layer decoded data is received from the first markup video display region, and the second decoding method comprises rendering the reconstruction of the frame of the video signal in a second markup video display region.

\* \* \* \* \*